(12) United States Patent
Daga et al.

(10) Patent No.: US 12,724,848 B2
(45) Date of Patent: Sep. 1, 2026

(54) GENERATING COHESIVE EXPLANATIONS THAT COMMUNICATE INSIGHTS AND PATTERNS ON MULTI-DIMENSIONAL FINANCIAL PLANNING DATA

(71) Applicant: Oracle International Corporation, Redwood Shores, CA (US)

(72) Inventors: Manish Daga, Karnataka (IN); Muthu Ranganathan, Karnataka (IN); Selvarajan Kandasamy, Karnataka (IN); Shivaranjan Gurunanjappa, Karnataka (IN); Nitin Rawat, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/169,193

(22) Filed: Apr. 3, 2025

(65) Prior Publication Data

US 2026/0064809 A1 Mar. 5, 2026

Related U.S. Application Data

(60) Provisional application No. 63/690,739, filed on Sep. 4, 2024.

(51) Int. Cl.
*G06F 16/00* (2019.01)
*G06F 16/3329* (2025.01)
*G06F 18/21* (2023.01)

(52) U.S. Cl.
CPC .... *G06F 18/2178* (2023.01); *G06F 16/33295* (2025.01)

(58) Field of Classification Search
CPC .................................................. G06F 16/33295
USPC .......................................................... 707/736
See application file for complete search history.

(56) References Cited

U.S. PATENT DOCUMENTS

2025/0284721 A1* 9/2025 Agrawal ............. G06F 16/3329
2026/0046297 A1* 2/2026 Sheehan ............. H04L 63/1425

OTHER PUBLICATIONS

U.S. Appl. No. 18/767,304, filed Jul. 9, 2024 and titled "Autonomous Generation of Task Completion Narratives".

(Continued)

*Primary Examiner* — Chelcie L Daye
(74) *Attorney, Agent, or Firm* — Invoke

(57) ABSTRACT

Systems, articles, and computer-implemented methods are disclosed for generating natural language summaries of a multi-dimensional analysis of a detected anomaly within a member of multi-dimensional data by prompting a LLM with a prompt generated to include data about the anomaly in a manner understandable by the LLM. The prompt to the LLM includes a path to a member of the hierarchy containing an anomaly with a delimiter between the member and ancestor nodes. The delimiter allows the ancestral context of the member of the hierarchy to be understood by the LLM. The prompt also includes a metric defining a magnitude of the anomaly in relation to another value, such as an average, a value of the anomaly, a time corresponding to the anomaly, and one or more examples of other anomalies with included data about those anomalies matching the type of data provided for the detected anomaly.

20 Claims, 10 Drawing Sheets

(56) References Cited

OTHER PUBLICATIONS

Guan, W. et al., "DABL: Detecting Semantic Anomalies in Business Processes Using Large Language Models", arXiv.org, Jun. 22, 2024.
Omarsdottir, Porunn Arna, "Automatic generation of anomaly reports in a train control system—Using Natural Language Generation and Case-Based Reasoning", Masters Thesis, Computer Science, Delft University of Technology, Sep. 15, 2020.
Su, J. et al. "Large Language Models for Forecasting and Anomaly Detection: A Systematic Literature Review", ArXiv.org, Feb. 15, 2024.
Yadav, N. et al., "DOCSNAP.AI—An Advanced Document Summarization Tool", International Journal of Creative Research Thoughts (IJCRT), vol. 12, Issue 4, Apr. 4, 2024.

* cited by examiner

GENERATING COHESIVE EXPLANATIONS THAT COMMUNICATE INSIGHTS AND PATTERNS ON MULTI-DIMENSIONAL FINANCIAL PLANNING DATA

CROSS-REFERENCE TO RELATED APPLICATIONS

This application claims the benefit of U.S. Provisional Patent Application No. 63/690,739 filed Sep. 4, 2024, the entire disclosure of which is incorporated by reference herein in its entirety for all purposes.

BACKGROUND

Multi-dimensional data records vast amounts of information with many inter-connected relationships between portions of the data. Multi-dimensional data analysis involves analyzing data from multiple data views in order to discover patterns within the data that are not apparent. The interconnections between portions of the data allow for a great deal of insight, however a determining when multi-dimensional data represents an important datapoint and describing the results of multi-dimensional data analysis can be difficult.

Implementing multi-dimensional analysis into useful status updates may involve in-depth and constant review and analysis of the data, as updated data is received, by a user able to interpret the data. Conveying the results of key takeaways from multi-dimensional data analysis can be critical for success of a project or organization strategy.

BRIEF SUMMARY

In some embodiments, systems, articles, and computer-implemented methods are disclosed for generating natural language summaries of a multi-dimensional analysis of a detected anomaly within a member of multi-dimensional data by prompting a LLM with a prompt generated to include data about the anomaly in a manner understandable by the LLM. The prompt to the LLM includes a path to a member of the hierarchy containing an anomaly with a delimiter between the member and ancestor nodes. The delimiter allows the ancestral context of the member of the hierarchy to be understood by the LLM. The prompt also includes a metric defining a magnitude of the anomaly in relation to another value, such as an average, a value of the anomaly, a time corresponding to the anomaly, and one or more examples of other anomalies with included data about those anomalies matching the type of data provided for the detected anomaly.

In a particular embodiment, a computer-implemented method includes determining that analysis is enabled for a hierarchy of data of a multi-dimensional set of data. The analysis is disabled for one or more other hierarchies of data of the multi-dimensional set of data. The computer-implemented method further includes, based at least in part on determining that the analysis is enabled, analyzing members of the hierarchy to detect a pattern or anomaly within the hierarchy, and in response to detecting the pattern or anomaly in a member of the hierarchy, generating a prompt including a path to the member including one or more ancestor nodes and a delimiter between the one or more ancestor nodes and the member, one or more values identified as having the pattern or anomaly for the member, one or more metrics that define an extent of the pattern or anomaly in relation to one or more other values, one or more time periods during which the pattern or anomaly occurred, one or more examples including one or more example paths, one or more example values, one or more example metrics, one or more example time periods, and one or more example summaries of one or more example patterns or anomalies for one or more example members at the one or more example paths. The computer-implemented method further includes prompting a large language model with the prompt to generate a resulting summary of the pattern or anomaly, and causing display of at least part of the resulting summary of the pattern or anomaly.

In a further embodiment, the one or more other values is a mean value and the anomaly is a detected by a determination that the one or more metrics that define an extent of the pattern or anomaly in relation to one or more other values is three standard deviations from a mean value.

In the same or a different further embodiment, the one or more other values is a forecasted value generated by a mathematical trend of a set of data and the one or more values identified as having the pattern or anomaly for the member is a recorded value.

In another embodiment that extends the particular embodiment or any further embodiment, the one or more other values is a forecasted value generated by a mathematical trend of a set of data and the one or more values identified as having the pattern or anomaly for the member is a predicted value generated by a machine learning model trained to predict values for the hierarchy of data.

In another embodiment that extends the particular embodiment or any further embodiment, the one or more example paths includes the delimiter between one or more example ancestors and the one or more example members In another embodiment that extends the particular embodiment or any further embodiment, the computer-implemented method further includes receiving user feedback for the resulting summary indicating a modification to the resulting summary, re-prompting the large language model to generate a modified summary based on the indicated modification, and causing display of at least part of the modified summary.

In another embodiment that extends the particular embodiment or any further embodiment, the computer-implemented method is performed by an artificial intelligence agent trained on multi-dimensional training data of a same data type as the multi-dimensional set of data. One or more other data types are handled by one or more other agents of a plurality of agents. The computer-implemented method further includes filtering the data of the multi-dimensional set of data based on a method of filtering relevant to the data type of the multi-dimensional set of data.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
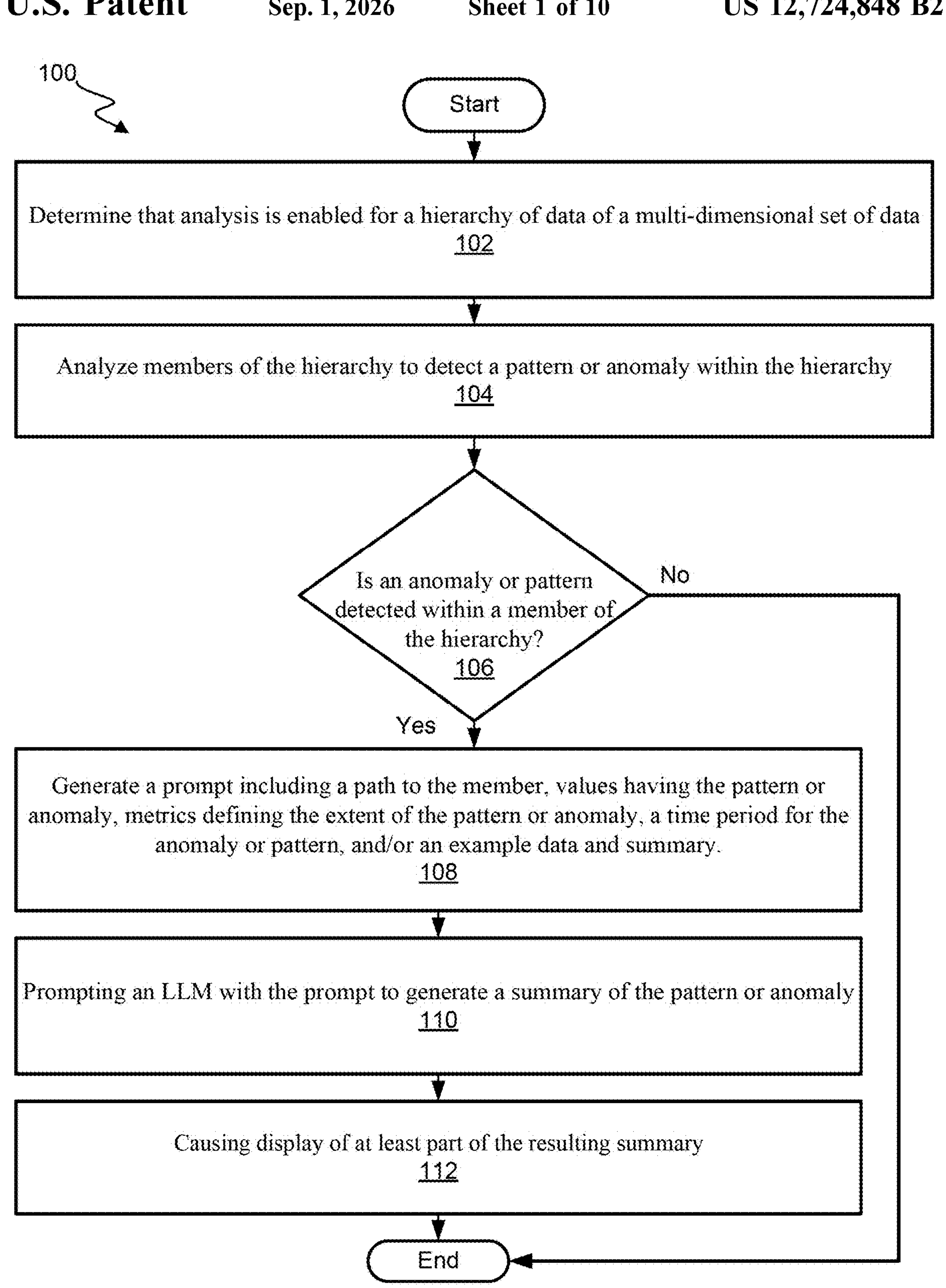
FIG. 1 illustrates a flow chart of an example process for generating multi-dimensional data analysis summaries.

A description is provided for generating natural language summaries of multi-dimensional analyses. In various embodiments, the generation of multi-dimensional analysis summaries is implemented using non-transitory computer-readable storage media to store instructions which, when executed by one or more processors of a computer system, cause display of the user interface and processing of the received input to generate multi-dimensional analysis summaries. The multi-dimensional analysis summary generation may be implemented on a local or cloud-based computer system that includes processors and a display for showing the user interface to a user for generating multi-dimensional analysis summaries. The computer system may communicate with client computer systems for generating multi-dimensional analysis summaries.

A description of generating multi-dimensional analysis summaries is provided in the following sections:

MULTI-DIMENSIONAL ANALYSIS
PROMPT GENERATION.
EXECUTION OF PROMPT AND DISPLAY OF SUMMARY.
RE-PROMPTING LARGE LANGUAGE MODEL
SUMMARY GENERATION BY AI AGENTS
COMPUTER SYSTEM ARCHITECTURE

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Multi-Dimensional Analysis

Multi-dimensional analysis concerns the analysis of data within a dataset containing a plurality of data dimensions. By selecting values for a set of dimensions, a data view may be constructed comprising the data records containing the selected values for the set of dimensions. The data view represents a union of all the records of the selected set of dimension values. Data analysis between further values of the records of other dimensions may be performed on the data view to create analytical results specific to the selected values of the set of dimensions.

Such analysis may include identification of anomalous values within the data views, comparing the values of two dimensions across the data view such as to compare a prediction to recorded real values or other prediction values of another source or method. Multi-dimensional analysis allows for insights into the data that are more detailed than analysis across whole data sets.

Hierarchical data may be stored as a cube or a collection of dimensions, where each dimension has members arranged in a hierarchy. A "dimension" is a collection of related data items that are organized together and, for example, may share a common data structure, schema subset, or index, and may be related to other dimensions. Dimensions may have one or more attributes or fields that define values, or that define formulas for obtaining values. Non-limiting examples of dimensions may include account, department, business unit, product line, market, division, time, and location, and each dimension may have multiple levels of members or nodes with information. As used herein, the terms "member," "node," and "row" are used interchangeably to refer to an individual item of data hierarchically positioned in a structured dataset. Each member may be a child of another member or a root member for the dimension, forming a tree of members for each dimension that can be represented as a drill-down hierarchy of members along each dimension.

Data may be maintained at the lowest levels of the tree structure and rolled up to higher levels. For example, data on the monthly level of time data of January, February, and March may be rolled up to data on the quarterly level of time data, which may be rolled up to data on the annual level of time data. Similarly, data at the city level of a location dimension may be rolled up to data on the state level of the location dimension, which may be rolled up to data at the country level. Other dimensions, such as product information, sales information, and other information, may be linked to the time dimension such that slices of data may be obtained as intersections between the corresponding values for the corresponding dimensions. Dimensions may be linked together using keys or other references that identify specific members of other dimensions associated with a record. Additional details may be pulled from the other dimensions using the key as a reference to the other dimension and drilling down or rolling up in the data structure along the other dimension. For example, information about a particular product having units sold in a given quarter may be determined from an intersection between the product, sales, and time dimensions as a data slice.

A schema or hierarchical structure may be applied to the members, and different dimensions may support different sub-schemas of the database where data fitting within the dimension conforms to a certain data format and has certain well-defined relationships with other data in the dimension. Data fitting within certain parts of the schema or hierarchical structure may feed into or be bound to formulas, workflows, models or other logic managed by an application to use the data to efficiently determine values or accomplish tasks. For example, the weight of all units in a "units produced" portion of the hierarchy may be used in a first formula for determining individual shipping costs for each unit and a second formula for aggregating shipping costs across all units.

In one embodiment, a multi-dimensional data management application provides access to data for analysis and management. Dimensions that align with existing structures, relationships, and logic in a stored hierarchy of data may have pre-configured structure, relationships, and logical formulas, models, or workflows that use the values provided or statically defined to populate other dynamic nodes that depend on the static values. Uploaded data may fit into a structure expected by existing logic such that the existing logic is automatically updated as the uploaded data is provided. For example, if a dynamic node exists where all children nodes are summed together, and the uploaded data adds or updates a child node of the dynamic node, the dynamic node may be updated automatically to account for the uploaded data.

In one embodiment, a data management application such as Oracle Essbase® provides views of multi-dimensional data, and the views provide options for modifying or analyzing the multi-dimensional data according to a data management user interface. In one example, the views are displayed in a Microsoft Excel interface using a Microsoft Excel plug-in to control what data is visible in which cells, whether that data is modifiable, and what database structures of a back-end database are mapped to the cell such that the corresponding cell holds value(s) of the database structures and the database structures get modified when the corresponding cell gets modified.

In another example, the views are displayed in a browser interface that shows a grid of cells where code executed in the browser controls what data is visible in which cells, whether the data is modifiable, and what database structures of a back-end database are mapped to the cell such that the corresponding cell holds value(s) of the database structures and the database structures get modified when the corresponding cell gets modified.

A particular combination of values across different dimensions is shown on the screen as one or more data slices, and the data slice(s) may be filtered or combined with other data slice(s) to change a shape of the dataset being visualized, modified, or analyzed.

In constructing a data view, one or more dimensions are selected to be used to define the data view of a database structure. The dimensions may describe levels of hierarchy in the case of hierarchical data. In this case, selecting a specific point in the hierarchy includes within the data view all data descendent from that specific point in the hierarchy and excludes all other data that is not descendent from that specific point in the hierarchy. For example, a hierarchical data structure may store data for multiple regions an organization operates in with multiple constituent entities of the organization, each with their own set of staff. The data is stored hierarchically such that a first dimension defines the region for a data record, a second dimension defines an entity, where each entity is associated with a specific region and therefore descendent from that region, and each record represents a staff member with each record having am entity and region dimension and therefore descending from their entity and region. In attempting to perform data analysis on the staff of a specific region, the value of the specific region is selected for the region dimension which creates a data view including all descendent entities and descendent staff for that region and excluding those records of other regions. Data views may be selected based on multiple dimensions, such as a data view selecting for a region, entity, product, and account dimensions. The resulting data view is a union of all the records of the selected region, selected entity, selected product, and selected account dimensions.

Before performing analysis on a data view, the data analysis system may determine if analysis is enabled for the dimensions selected. The dimensions may be enabled for analysis by inclusion within a data view or by data access controls. Data access controls may be implemented on a dimension-by-dimension basis such that a user's access credentials are checked against each dimension included for analysis to determine if analysis is enabled for that dimension. Dimensions may be determined to be enabled for analysis based on inclusion within a data view. By selecting a dimension or a predefined data view, the resulting constructed data view of extracted data of those dimensions are said to be enabled while data of other dimensions are said to be disabled.

After a data view is constructed, any number of analyses may be performed on that data view. Multi-dimensional data analysis may include anomaly detection among the records of the data view for a specific dimension of the data view.

First, the data of the data view is extracted, including at least the data of an input dimension that is varied across records, such as time, to determine anomalies in an output dimension, such as an expense value.

Analysis may be performed in any number of circumstances and in response to multiple conditions. For example, analysis may be performed periodically, where a device storing data tracks a time period for analysis and performs the analysis at a regular time interval. Alternatively, analysis may be performed in response to the addition of more data to the data set.

Anomaly detection analysis may be performed by determining a deviation of the value of a selected record from the mean across the records of a data view for a given dimension and comparing that deviation to a threshold. The given dimension across which to perform the anomaly detection may be a time dimension. In this case, the required data of the analyzed dimensions are extracted and stored as a time series across which the anomaly analysis is performed.

The deviation may be determined as a normalized value such as a standard deviation which is compared to a threshold of standard deviations. For example, the normalized difference between the detected value and the mean may be beyond three standard deviations from the mean, with three standard deviations being the threshold value, therefore the detected value is marked as an anomaly and values describing the anomaly are stored.

Alternatively, anomaly detection may be performed using a modified Z score, or a standardized score measured against the median of a set of data. The anomaly may be detected by an absolute deviation from a median being beyond a given threshold value.

Alternatively, anomaly detection may be performed using an interquartile range, midspread, fourth spread, or H-spread. In this case, the anomaly is detected by first dividing the data set into quartiles via linear interpolation, then determining the anomalous value to be greater than an upper or lower quartile value by a given value, such as a percentage of the width between the mean value and the upper or lower quartile value.

Alternatively, anomaly detection may be performed by determining a deviation from a dynamically constructed range from the values of the data view. In this case, a metric is used to determine clusters of values based on an average variance. Anomalous values are values that do not fit within a threshold difference from an average variance of any cluster of data.

In yet another alternative, detection may be performed by applying a plurality of the above described variance metrics. Anomaly detection may be performed by applying a number of variance metrics, each with their own condition for triggering, such as a threshold, which may each independently cause the detection of a pattern or anomaly. For example, a first variance metric may be defined for a difference between a real value and a predicted value and a second variance metric may be defined for a difference between a predicted value and a forecasted value. If the first variance metric or the second variance metric satisfies their respective threshold difference, then a pattern or anomaly is detected.

In response to detecting the anomaly, data values representing the anomaly or calculated in response to the anomaly are stored. For example the data analysis system may store the anomalous value, the mean value from which the anomalous value differs, and the calculated difference between the anomalous value and the mean. The data analysis system may also, in response to detecting the anomaly, calculate a percentage difference representing the percentage of the mean by which the anomalous value differs or a frequency of the anomaly. The data analysis system may also determine and store a number of previous anomalous value, a previous most anomalous data value, and the period for that previous most anomalous value.

In response to detecting the anomaly, an anomaly direction may be stored. The anomaly direction may indicate whether the anomaly value differs from a mean or threshold above the mean or threshold or below the mean or threshold. The data analysis system may determine whether to label the anomaly as positive or negative based on the dimension's inherent qualities. For example, a revenue dimension may have a normal mapping such that a value above the mean is labeled as a positive anomaly and a value below the mean is a negative anomaly. In contrast, an expense dimension may have an inverted mapping such that values above the mean are labeled as a negative anomaly and a value below the mean is a positive anomaly.

Forecast variance bias analysis may be performed by determining a deviation of the value of a selected record from the forecasted value for the selected record for a given dimension and comparing that deviation to a threshold. The given dimension across which to perform the anomaly detection may be a time dimension. In this case, the required data of the analyzed dimensions are extracted and stored as a time series across which the forecast variance bias analysis is performed.

The forecasted value may be an estimated value for a future time generated previously based on past data. For example, the forecasted value may be a value determined from a fit trend line of a set of previous values.

Prediction analysis may be performed by determining a deviation of the prediction value of a selected record from the forecasted value for the selected record for a given dimension and comparing that deviation to a threshold. The given dimension across which to perform the anomaly detection may be a time dimension. In this case, the required data of the analyzed dimensions are extracted and stored as a time series across which the prediction analysis is performed.

The predicted value may be a value generated by a machine learning model for predicting values. Therefore, a difference between the predicted value and the forecasted value for a record represents the difference between a simple mathematical forecast and a prediction generated based on a machine learning model trained on similar data.

Prompt Generation

In order to generate an analysis summary, a prompt is generated to prompt a large language model (LLM) to generate an output summary. In various embodiments, the techniques herein refer to "a prompt" being generated, and "the prompt" is intended to refer to a single request or multiple requests that, together, serve to prompt the LLM. LLMs may be prompted in the same session using one or multiple requests as the prompt to perform functionality, and the delineation between requests to the LLM can be split in any manner in accordance with the techniques described herein. The prompt may include a set of instructions for the large language model to define the desired output, set constraints on the generation of that output, data for including in the project summary, and descriptions of the data included.

In one example, a configuration command may be provided to a query processing service in a user session or connection with a client to select a particular large language model for use with the natural language of incoming queries on a user session, or for given requests, from the client. For example, the "OpenAI" large language model provider may be chosen with named credentials. The model used may be, for example, gpt-3.5-turbo. Other example providers include, but are not limited to, Cohere, Azure AI, Google PaLM 2, Llama 3, etc. In various other examples, default credentials may be used by the query processing service. In one embodiment, the credentials include user-specific credentials, such as a user-specific inner session identifier, that allow the LLM service to switch between supporting different users within the same LLM session using the same LLM connection credentials. In this embodiment, context from a given user may be retrieved using the user-specific inner session identifier before processing a natural language query for the given user. In another embodiment, an application uses the same LLM service for users but may use different LLM sessions for different users. The LLM session may be authenticated using a token that is established to refer to a particular user session. The token may be passed by the application to establish or re-establish the authenticated session with the LLM and begin sending prompts.

FIG. 1 depicts a flowchart diagram 100 for an example process to generate natural language multi-dimensional analysis summaries. At block 102, a determination is made as to whether analysis is enabled for a hierarchy of data of a multi-dimensional set of data. One or more other hierarchies of data of the multi-dimensional set of data may have analysis disabled. At block 104, based on the determination that analysis is enabled for the hierarchy of data, members of the hierarchy are analyzed to detect a pattern or anomaly within the hierarchy. At block 106, the result of the analysis in block 104 is analyzed, in the case that no pattern or anomaly is detected the process ends or may repeat with another hierarchy for which analysis is enabled or repeat with a different analysis method. In the case that a pattern or anomaly is detected, the process continues to block 108. At block 108, the data analysis system generates a prompt to prompt a large language model to generate a summary of the multi-dimensional analysis based on included data in the prompt. The prompt may include a path to the member, wherein the path includes one or more ancestor nodes and a delimiter between the one or more ancestor nodes and the member, one or more values identified as having the pattern or anomaly for the member, one or more metrics that define an extent of the pattern or anomaly in relation to one or more other values, or one or more time periods during which the pattern or anomaly occurred. The prompt may also include one or more examples including one or more example paths, one or more example values, one or more example metrics, one or more example time periods, and one or more example summaries of one or more example patterns or anomalies for one or more example members at the one or more example paths. At block 110, a large language model is prompted with the prompt to generate a resulting summary of the pattern or anomaly. At block 112, a resulting summary received from the large language model is caused to be displayed, at least in part, such as to a user requesting the summary.

At block 108, the generated summary is received by the data analysis system from the large language model.

At block 110, the received summary is displayed to the user.

Figure 2:
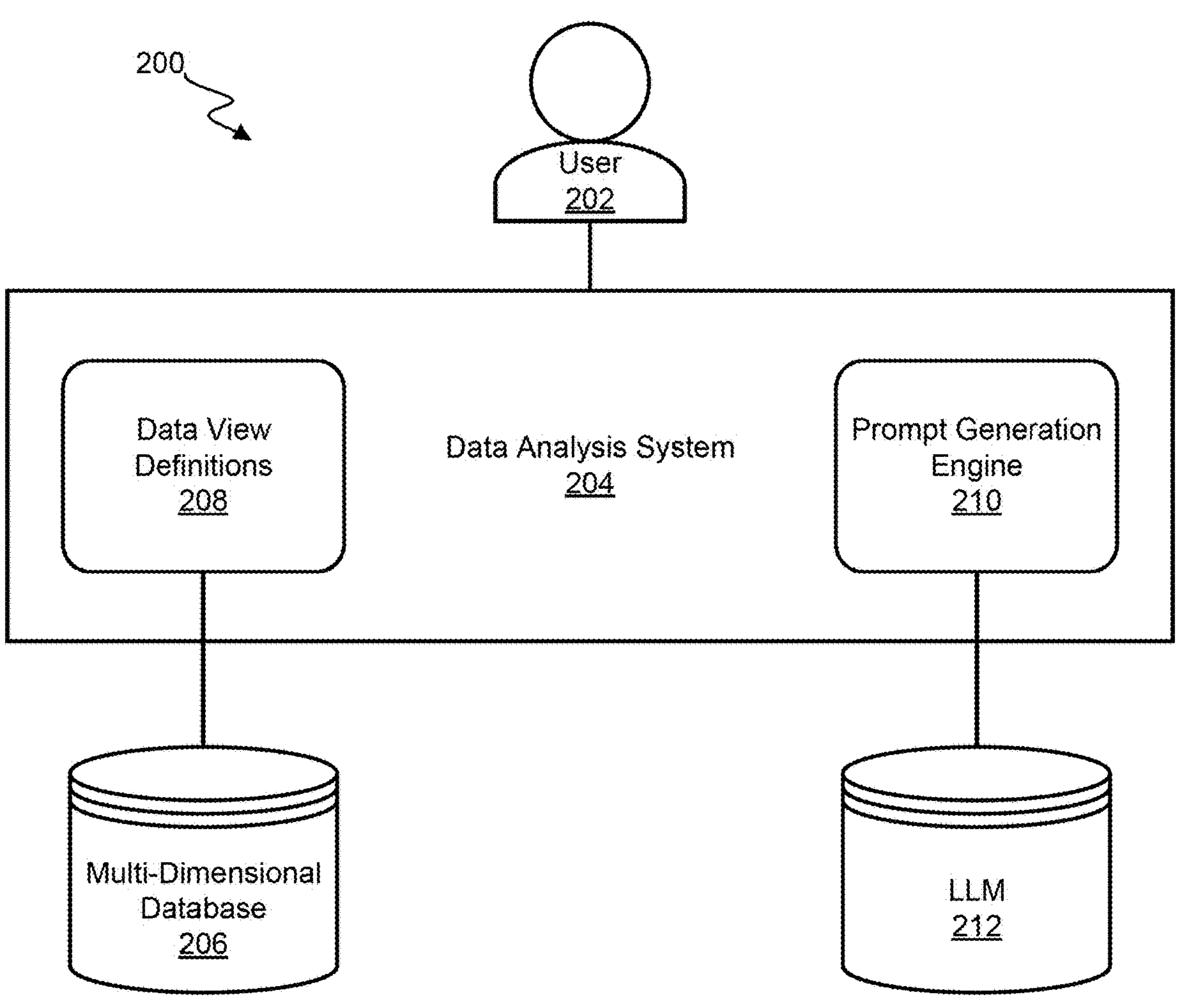
FIG. 2 illustrates a system diagram showing an example cloud infrastructure for generating multi-dimensional data analysis summaries.

FIG. 2 depicts a distributed system 200 for generating multi-dimensional data analysis summaries. A user 202, interacts with a data analysis system 204 by entering a user input directing the data analysis system 204 to generate a summary of some multi-dimensional analysis. The user input may indicate a type of analysis to perform with specific data or data views to perform the analysis on, or the user input may select an analysis that is pre-defined or has already been performed to generate a summary for. The data analysis system 204 accesses a multi-dimensional database to retrieve the data for the specific data view of a set of data view definitions 208. The data retrieved from the multi-dimensional database is then analyzed using the method of analysis indicated by the user input. The values of the analysis are stored and used by a prompt generation engine 210 to generate a prompt to a large language model 212 to cause the large language model to generate a summary of the performed analysis. A response is received by the data analysis system 204 which is displayed to the user 202.

Figure 3:
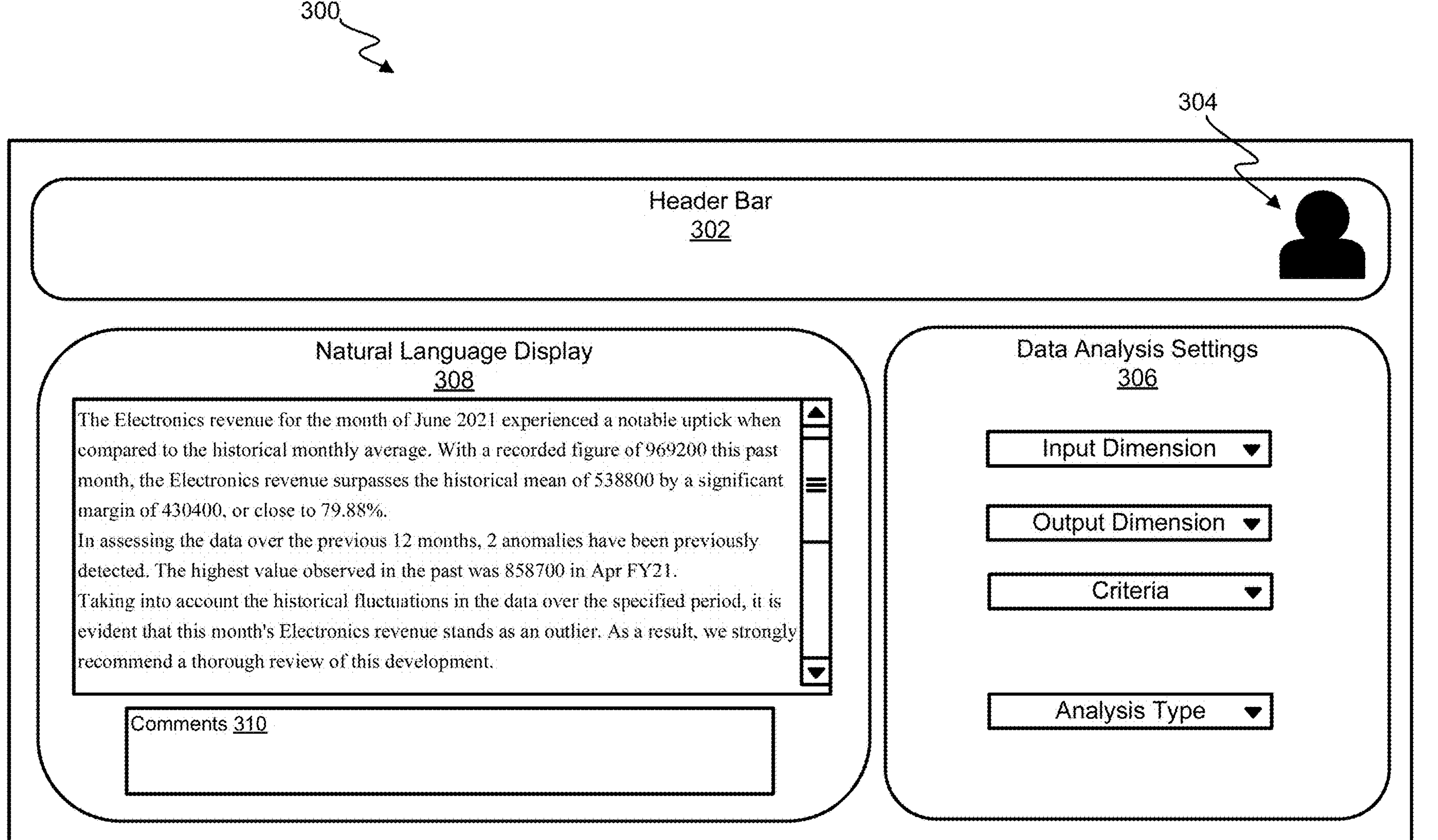
FIG. 3 illustrates a diagram of an example user interface for receiving requests to summarize multi-dimensional data analyses.

FIG. 3 depicts an example user interface 300 for requesting multi-dimensional analysis summaries. The example user interface may include a header bar 302 indicating a recognition of the user 304 via a set of user credentials. The set of user credentials may be used to confirm data access rights by the user. The user interface 300 also includes a set of data analysis settings 306 for selection by the user to indicate a type of analysis, a dimension upon which analysis should be performed, a dimension across which the analysis should be performed, or any other criteria of the analysis. A data analysis system interprets the user input in the data analysis settings 306, performs the analysis and generates a summary of the analysis which is displayed in a natural language display 308. The user interface 300 also includes a comment region 310 for receiving user comments regarding the generated summary. Comments entered in the comment region may be used to control the data analysis, such as by submitting a query to the data analysis system which may respond with a further generated summary derived from the same or a different pattern or anomaly.

The prompt may be generated automatically when populating a user interface detailing the data analysis or it may be generated in response to a received input by a user. The prompt may be presented to the user for confirmation or editing before passing the prompt to the large language model.

The prompt may include a set of instructions for generating the analysis summary. The instructions may direct the large language model as to the expected output, for example: "summarize the data provided below." The instructions may also indicate a context for the analysis summary, such as an email format, press release, or website description.

The set of instructions in the prompt may further include constraints on the generation of the summary. For example, the prompt may include a word count constraint, a constraint on the type of language to use in the summary, or constrain the response to a number of paragraphs. The set of instructions may also include constraints to conform the output of the large language model to an expected format for parsing or interpreting after generation such as an instruction to remove any introductory phrase responsive specifically to the request of the prompt.

The prompt may also include a number of fields of data to be included in the analysis summary including at least data representing the analysis result. These fields may detail elements of the analysis in numerical or textual format. The fields may be any number of metrics available for the given analysis and may be defined specifically for the analysis or may be a generic set of fields for all analyses. For example, the fields may include a field for a numerical value output as a result of the analysis, a field for a numerical value identified as the target of the analysis, or a field representing a value across which the analysis was performed. The fields used for the analysis summary may also be determined by the user. For example, the user may select from a list of pre-determined fields a number of fields to include in the summary. The available fields may also be restricted based on user credentials restricting access to certain fields of data. The fields selected may be determined automatically from the list of pre-determined fields from a context of the user's request, such as a user interface context or based on a user profile.

The data fields included in the prompt may include a path to a member of the data hierarchy on which the analysis was performed. The path may also include one or more ancestor nodes to the member of the data hierarchy, that is it may specify dimensions of the data view from the data hierarchy for the member. The path may be formatted such that it is more readily understood by a large language model. For example, dimensions within the path representing ancestor nodes may be separated by a delimiter to indicate a chain of dimensions in the hierarchy. An example of formatting with a delimiter may be "[first dimension].[second dimension].[member]" where the period acts as a delimiter between the dimensions in square braces.

The prompt may also include one or more examples of input data and a generated output response. The examples may include any of the data described above for inclusion in the prompt, and in particular may include examples of the same fields of data of which are provided for generating the analysis summary desired. For example, the examples may include an example path to a member, one or more example values, one or more example metrics, one or more example values or fields across which the analysis was performed. The example may also include an example output analysis summary responding to an example question posed for the example data. The example analysis summary may incorporate the example data provided in a way that the data provided should be included in an output analysis summary.

In various embodiments, prompts are generated to use information about a data schema of multi-dimensional data available in a user session with an application. The data schema may include dimension names (e.g., Region, Entity, Department, Product, and Time), member names, and drill-down and roll-up hierarchies that are available to view or manipulate in the user session. The data schema may be formatted in a hierarchical format, such as JSON, XML, or another structured and delimited format that distinguishes between members at different levels of the hierarchy.

In one embodiment, validating the content of the LLM reply includes verifying that the reply conforms to the correct length and data type constraints, if any. If the LLM reply includes a data structure consumable by the application, the validation may include verifying that the data structure conforms to a schema or set of structured instructions exposed by the application through an API.

In various embodiments, the application may provide a configuration interface to the user for configuring a workflow for handling LLM replies that could not be validated. The configuration could specify that the LLM may be re-prompted with the non-validated reply used as a non-conforming example that should be avoided, or to trigger an error message.

In one embodiment, JSON results from the LLM are parsed by searching for delimiters such as "{" and "}" or "[" and "]" in the response. The values may be embedded in the delimiters and extracted from the embedded structure to determine values predicted by the LLM. The consumable JSON object may be separated from a remainder of the response for consumption by the application to create an executable structure to trigger application functionality.

Prompt Generation for Anomaly Detection

A prompt for anomaly detection summarization may include an instruction describing the type of anomaly detection used. For example, the prompt may include an instruction such as "Write a summary of the findings of the interquartile analysis described by the data provided below." The prompt for anomaly detection summarization may also include data values relevant to describing the anomaly detected. The prompt may include data values representing the values identified as having the pattern or anomaly for a member of the dataset, one or more metrics that define an extent of the pattern or anomaly in relation to one or other values such as a mean value, and one or more time periods during which the pattern or anomaly occurred. The prompt may also include a data path to the member for which the anomaly was detected.

The prompt for anomaly detection summarization may also include a set of examples including example data and example anomaly summaries. The included summaries should maintain the same method of anomaly detection as used for the data for which an anomaly summary is to be generated. The included summaries may also indicate an example path to a member described with the same formatting as used in the path data for the anomaly to be described.

An example prompt and example response for an anomaly detection summary are included below.

Example Prompt for Detected Anomaly:

Follow the structure of responses in examples 1 through 4 exactly to complete the response for the last example. Do not provide any extra or irrelevant information.

Example 1

Question: Write a brief summary narrative for the data provided below.

Data: {Anomaly: 428, Mean: 255, absolute difference: 26.3, percentage difference: 67.84%, freq: month, num_periods: 24, previous anomalies count: 0, highest previous extreme value: 315, highest previous extreme value period: January 2010, Anomaly period: April 2011}

Anomaly Direction: Positive

Hierarchy: [SKU].[Merchandize].[Gross Profit].[Asia]

Response: The gross profit for Asia for the month of April 2011 experienced a notable uptick when compared to the historical monthly average. With a recorded figure of 428 this past month, the gross profit for Asia surpasses the historical mean of 255 by a significant margin of 173 or close to 67.84%.

In assessing the data over the previous 24 months, no anomalies have been previously detected. The highest value observed in the past was 315 in January 2010.

Taking into account the historical fluctuations in the data over the specified period, it is evident that this month's gross profit for Asia stands as an outlier. As a result, we strongly recommend a thorough review of this development.

Example 2

Question: Write a brief summary narrative for the data provided below.

Data: {Anomaly: 543874, Mean: 433567, absolute difference: 110307, percentage difference: 25.44%, freq: week, num_periods: 52, previous anomalies count: 2, highest previous extreme value: 556789, highest previous extreme value period: Week 23 2014, Anomaly period: Week 46 2014}

Anomaly Direction: Positive

Hierarchy: [TTX].[Analytics].[Nuts & Bolts].[Expenditure]

Response: The Nuts & Bolts expenditure for the week 46 of 2014 experienced a notable uptick when compared to the historical weekly average. With a recorded figure of 543874 this past week, the Nuts & Bolts expenditure surpasses the historical mean of 433567 by a significant margin of 110307 or close to 25.44%.

In assessing the data over the previous 52 weeks, 2 anomalies have been previously detected. The highest value observed in the past was 556789 in week 23 of 2014, which was also an anomaly.

Taking into account the historical fluctuations in the data over the specified period, it is evident that this week's Nuts & Bolts expenditure stands as an outlier. As a result, we strongly recommend a thorough review of this development.

Example 3

Question: Write a brief summary narrative for the data provided below.

Data: {Anomaly: 0.23, Mean: 4.79, absolute difference: 4.56, percentage difference: −95%, freq: quarter, num_periods: 16, previous anomalies count: 1, highest previous extreme value: 0.53, highest previous extreme value period: Q1FY16, Anomaly period: Q1FY18}

Anomaly Direction: Negative

Hierarchy: [Esselunga].[Supplier].[Shipments].[SKU0001]

Response: The SKU0001 shipments for the quarter 1 of 2018 experienced a notable downtick when compared to the historical quarterly average. With a recorded figure of 0.23 this past quarter, the SKU0001 shipments fell short of the historical mean of 4.79 by a significant margin of 4.56, or close to 95%.

In assessing the data over the previous 16 quarters, 1 anomaly has been previously detected. The lowest value observed in the past was 0.53 in quarter 1 of 2016, which was also an anomaly.

Taking into account the historical fluctuations in the data over the specified period, it is evident that this quarter's SKU0001 shipments stands as an outlier. As a result, we strongly recommend a thorough review of this development.

Example 4

Question: Write a brief summary narrative for the data provided below.

Data: {Anomaly: 420000, Mean: 100000, absolute difference: 480000, percentage difference: −48%, freq: month, num_periods: 18, previous anomalies count: 0, highest previous extreme value: 120000, highest previous extreme value period: April 22, Anomaly period: April 23}

Anomaly Direction: Negative

Hierarchy: [Workforce].[Maintenance].[Repairs].[Count]

Response: The Repairs count for April 23 experienced a notable downtick when compared to the historical monthly average. With a recorded figure of 420000 this past month, the Repairs count fell short of the historical mean of 100000 by a significant margin of 480000, or close to 48%.

In assessing the data over the previous 18 months, no anomalies have been previously detected. The lowest value observed in the past was 120000 in April 22.

Taking into account the historical fluctuations in the data over the specified period, it is evident that this month's Repairs count stands as an outlier. As a result, we strongly recommend a thorough review of this development.

Last Example

Question: Write a brief summary narrative for the data provided below.

Data: {Anomaly: 969200, Mean: 538800, absolute difference: 430400, percentage difference: 79.8%, freq: month, num_periods: 12, pervious anomalies count: 2, highest previous extreme value: 858700, highest extreme previous value period: April FY21, Anomaly period: June FY21}

Anomaly Direction: Positive

Hierarchy: [Account].[Statistics].[Revenue].[Electronics]

Example Response to Detected Anomaly Prompt

The Electronics revenue for the month of June 2021 experienced a notable uptick when compared to the historical monthly average. With a recorded figure of 969200 this past month, the Electronics revenue surpasses the historical mean of 538800 by a significant margin of 430400, or close to 79.88%.

In assessing the data over the previous 12 months, 2 anomalies have been previously detected. The highest value observed in the past was 858700 in April FY21.

Taking into account the historical fluctuations in the data over the specified period, it is evident that this month's Electronics revenue stands as an outlier. As a result, we strongly recommend a thorough review of this development.

Prompt Generation for Forecast Variance Bias Analysis

A prompt for forecast variance bias analysis summarization may include an instruction describing the type of forecast used. The prompt for forecast variance bias analysis summarization may also include data values relevant to describing the forecast variance. The prompt may include data values representing the original forecast, one or more actual values, and one or more difference metrics such as a percentage difference or an absolute difference between the actual and forecasted values. The prompt may also include calculated values from a set of actual values such as a number of periods under or over the forecast. The prompt may also include a data path to the member for which the forecast variance was calculated.

The prompt for forecast variance bias analysis summarization may also include a set of examples including example data and example forecast variance bias analysis summaries. The included summaries should maintain the same method of forecast variance calculation as used for the data for which an anomaly summary is to be generated. The included summaries may also indicate an example path to a member described with the same formatting as used in the path data for the forecast variance to be described.

An example prompt an response for a forecast variance bias analysis summary are included below.

Example Forecast Variance Bias Prompt:

Follow the structure of responses in examples 1 through 3 exactly to complete the response for the last example. Do not provide any extra or irrelevant information.

Example 1

Question: Write a brief summary narrative for the data provided below.

Data: {Actual: 125, Forecast: 150, percentage difference: 21.2%, mean absolute difference: 26.3, num_periods_overforecast: 8, num_periods_underforecast: 4, num_periods: 12, bias_insight: No}

Hierarchy: [SKU].[Merchandize].[Gross Profit].[Asia]

Time periods: September FY22 to August FY23

Response:

During the period from September FY22 to August FY23, the actual Gross Profit for Asia amounted to 125, which is notably lower than the forecasted figure of 150. This variance between the actual and the forecast reflects a substantial deviation, amounting to a percentage difference of 21.1% and a mean deviation of 26.3.

It is worth noting that the forecasted values exceeded the actual values for 8 out of 12 periods under analysis. However, no discernible bias indicating consistent underforecasting or overforecasting was observed.

Example 2

Question: Write a brief summary narrative for the data provided below.

Data: {Actual: 43987, Forecast: 32983, percentage difference: −34%, mean absolute difference: 12455, num_periods_overforecast: 7, num_periods_underforecast: 45, num_periods: 52, bias_insight: Underforecast}

Hierarchy: [TTX].[Analytics].[Nuts & Bolts].[Expenditure]

Time periods: W1 2016 to W52 2016

Response: During the period from W1 2016 to W52 2016, the actual Nuts & Bolts

Expenditure amounted to 43987, which is notably higher than the forecasted figure of 32983. This variance between the actual and the forecast reflects a substantial deviation, amounting to a percentage difference of 34% and a mean deviation of 12455.

It is worth noting that the forecasted values fall short of the actual values for 45 out of 52 periods under analysis, indicating consistent underforecasting.

Example 3

Question: Write a brief summary narrative for the data provided below.

Data: {Actual: 0.42, Forecast: 0.96, percentage difference: 64%, mean absolute difference: 0.45, num_periods_overforecast: 10, num_periods_underforecast: 2, num_periods: 12, bias_insight: Overforecast}

Hierarchy: [Esselunga].[Supplier].[Shipments].[SKU0001]

Time periods: Q1FY16 to Q4FY18

Response: During the period from Q1FY16 to Q4FY18, the actual SKU0001 Shipments amounted to 0.42, which is notably lower than the forecasted figure of 0.96. This variance between the actual and the forecast reflects a substantial deviation, amounting to a percentage difference of 64% and a mean deviation of 0.45.

It is worth noting that the forecasted values exceed the actual values for 10 out of 12 periods under analysis, indicating consistent overforecasting.

Last Example

Question: Write a brief summary narrative for the data provided below.

Data: {Actual: 188515.0, Forecast: 234144.0, percentage difference: −32.4%, mean absolute difference: 60396.0, num_periods_overforecast: 17, num_periods_underforecast: 7, num_periods: 24, bias_insight: No} Hierarchy: [Account].[Statistics].[Revenue].[Electronics]

Time periods: July-19 to June-21

Example Response to Forecast Variance Bias Prompt:

During the period from July-19 to June-21, the actual Electronics Revenue amounted to 188515.0, which is notably lower than the forecasted figure of 234144. This variance between the actual and the forecast reflects a substantial deviation, amounting to a percentage difference of 32.4% and a mean deviation of 60396.0.

It is worth noting that the forecasted values exceeded the actual values for 17 out of 24 periods under analysis. However, no discernible bias indicating consistent underforecasting or overforecasting was observed.

Prompt Generation for Prediction Analysis

A prompt for prediction analysis summarization may include an instruction describing the type of forecast or prediction used. The prompt for prediction analysis summarization may also include data values relevant to describing the prediction and forecast. The prompt may include data values representing the original forecast, one or more prediction values, and one or more difference metrics such as a percentage difference or an absolute difference between the prediction and forecast values. The prompt may also include a data path to the member for which the prediction was calculated.

The prompt for prediction analysis summarization may also include a set of examples including example data and example prediction analysis summaries. The included summaries should maintain the same method of prediction/forecast variance calculation as used for the data for which an anomaly summary is to be generated. The included summaries may also indicate an example path to a member described with the same formatting as used in the path data for the prediction to be described.

An example prompt and response for a prediction analysis summary are included below.

Example Prediction Analysis Prompt

Follow the structure of responses in examples 1 through 2 exactly to complete the response for the last example. Do not provide any extra or irrelevant information.

Example 1

Question: Write a brief summary narrative for the data provided below.

Data: {Prediction: 969200, Forecast: 538800, percentage difference: 64.5%, mean absolute difference: 430400, model: ARIMA, metric: MAPE, accuracy: 0.75}

Hierarchy: [SKU].[Merchandize].[Gross Profit].[Asia]

Time periods: 12 month Response: The predicted gross profit for Asia in the upcoming 12 months is anticipated to reach 969200, in contrast to the forecast of 538800. This outcome reflects a substantial variance between the forecast and the base prediction, amounting to a mean percentage difference of 64.5% and a mean absolute difference of 430400.

The predictions were generated using a model that had MAPE of 0.75 on the historical data. Oracle Auto Predict engine used ARIMA which was the best-fit mode! on the historical data with the lowest error. Please review if you would like to adjust the forecast.

Example 2

Question: Write a brief summary narrative for the data provided below.

Data: {Prediction: 35.4, Forecast: 55.8, percentage difference: 79.1%, mean absolute difference: 20.4, model: Prophet, metric: RMSE, accuracy: 2.167}

Hierarchy: [TTX].[Analytics].[Nuts & Bolts].[Expenditure]

Time periods: 4 week

Response: The predicted expenditure for Nuts & Bolts in the upcoming 4 weeks is anticipated to reach 35.4, in contrast to the forecast of 55.8. This outcome reflects a substantial variance between the forecast and the base prediction, amounting to a mean percentage difference of 79.1% and a mean absolute difference of 20.4.

The predictions were generated using a model that had RMSE of 2.167 on the historical data. Oracle Auto Predict engine used Prophet which was the best-fit model on the historical data with the lowest error. Please review if you would like to adjust the forecast.

Last Example

Question: Write a brief summary narrative for the data provided below.

Data: {Prediction: 41569.0, Forecast: 30561.0, percentage difference: 25.9%, mean absolute difference: 11007.88, model: ARIMA, metric: R-square, accuracy: 0.35}

Hierarchy: [Account].[Statistics].[Revenue].[Consumer Channel]

Time periods: 6 month

Example Prediction Analysis Prompt Response

The predicted revenue for Consumer Channel in the upcoming 6 months is anticipated to reach 41569.0[in contrast to the forecast of 30561.0. This outcome reflects a moderate variance between the forecast and the base prediction, amounting to a mean percentage difference of 25.9% and a mean absolute difference of 11007.88.

The predictions were generated using a model that had R-square of 0.35 on the historical data. Oracle Auto Predict engine used ARIMA which was the best-fit model on the historical data with the lowest error. Please review if you would like to adjust the forecast.

Execution of Prompt and Display of Summary

After generation of the prompt, the prompt is used to prompt a large language model to generate the desired output analysis summary. The prompt may be sent to the large language model in a new session with the large language model or in a persistent session for generating multiple analysis summaries. The generated summary is received from the large language model in a natural language format, which may or may not require additional post-processing.

The received output summary may be automatically parsed and edited based on default rules. For example, a pre-determined rule may direct the data analysis system to parse the output summary and remove pre-determined language, such as introductory language describing the summary generated. For example, the data analysis system may compare the first sentence of the generated summary for text containing "the summary", "this summary", "the analysis summary", "this analysis summary", "the first section", "the first paragraph", "the second paragraph," and remove those sentences so as to detect introductory language included by the large language model. Another default rule may automatically parse the output summary for numerical values and a preceding keyword to compare with the associated value in the project data.

Figure 4:
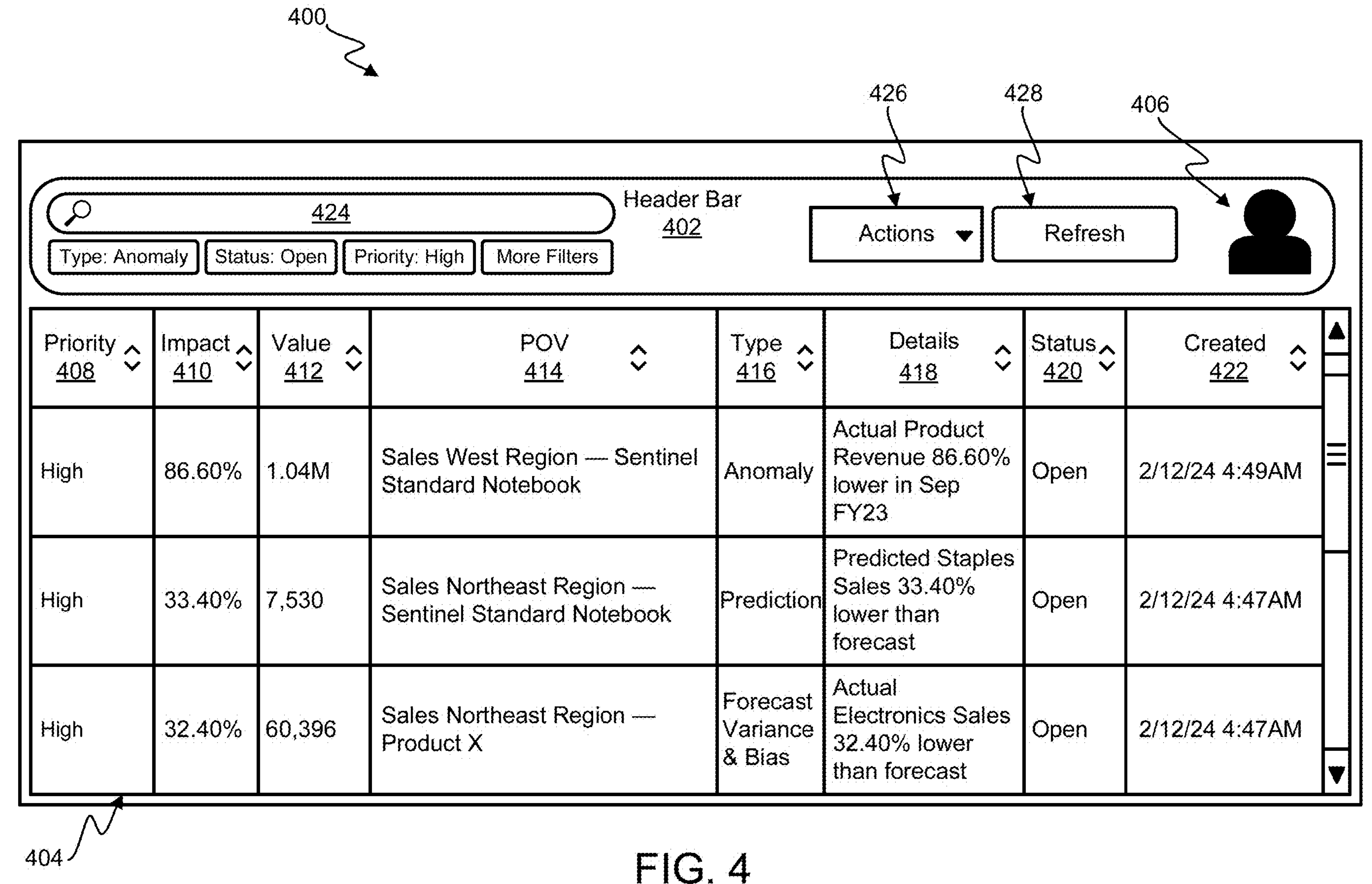
FIG. 4 illustrates a diagram of an example user interface for displaying generated summaries of patterns or anomalies for management by a user.

FIG. 4 depicts a user interface 400 for managing generated summaries. The user interface may contain a plurality of regions 402-404 such as a header region 402 that contains controls for the user interface and a display region 404 for displaying information. The user interface 400 may detect a user 406 such as by a set of user credentials. The user interface 400 may determine by the user credentials various settings for the display of data such as whether display of certain data is permitted. The display region 404 may display data 408-422 of generated summaries. The data comprises a priority 408 which may indicate a setting for the importance of the summary such as based on the relevance in time or a setting determined from the type of pattern or anomaly described. The data also comprises an impact 410 which may describe a value of the pattern or anomaly determined. The data also comprises a value 412 which may describe a value associated with the pattern or anomaly such as the value which is determined to be anomalous. The data also comprises a point of view 414 which may represent a data view used in determining the anomaly. The data also comprises a type 416 which describes the type of pattern or anomaly described such as an anomaly, a prediction, or a forecast variance bias. The data also comprises details 418 describing the pattern or anomaly detected. The data also comprises a status 420 which may describe the current state of the analysis or summary generation. The data also comprises a date 422 such as a date the summary was generated. The user interface 400 may also contain a set of navigation tools 424 such as a search or filtering function for controlling the data of summaries displayed. The user interface 400 may also contain a selection for actions to perform with respect to the summaries such as selecting a publication or editing mode for interacting with the displayed summaries. The user interface 400 may also contain a refresh selection for updating the currently displayed summaries.

Figure 5:
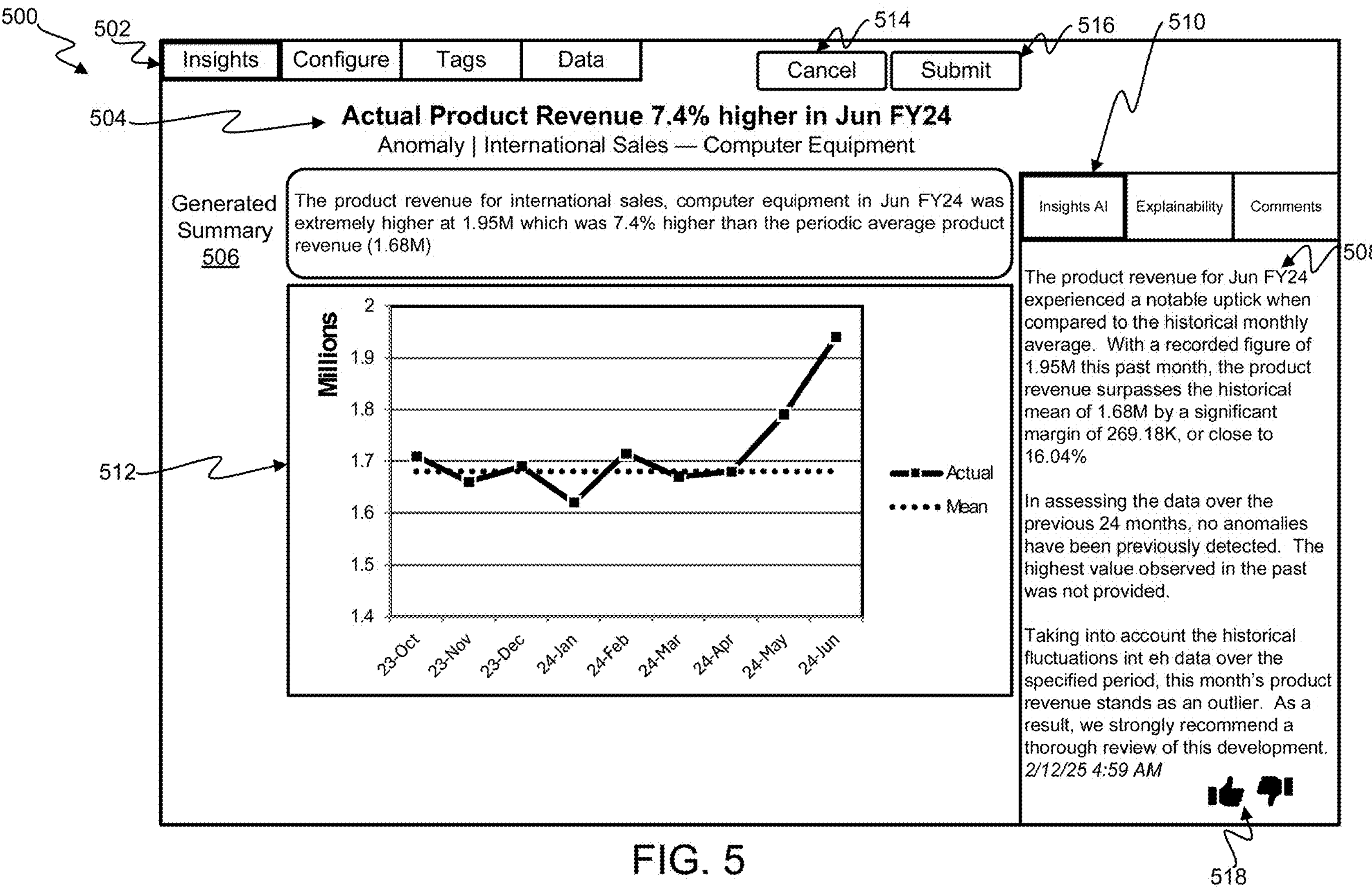
FIG. 5 illustrates a diagram of an example user interface for displaying generated summaries of patterns or anomalies with graphical representations of the patterns or anomalies and a more detailed summary of the pattern or anomaly.

FIG. 5 depicts a user interface 500 for displaying a detailed view of a pattern or anomaly for which a summary was generated. The user interface 500 may contain a number of views 502 including a view for displaying a detailed view of a pattern or anomaly. The user interface 500 displays a current pattern or anomaly 504 including a metadata of the pattern or anomaly such as a title or data view. The user interface 500 includes a generated summary 506 for the current pattern or anomaly 504. The user interface may display the generated summary 506 along with a further generated summary 508 which may be displayed via a further insights view 510. The further generated summary 508 may be a more detailed summary of the same current pattern or anomaly 504. The further generated summary 508 and the generated summary 506 may be generated separately or one may be derived from the other by re-prompting a large language model to generate an alternative summary. The user interface 500 may also display the generated summary 506 along with a data visualization 512 generated for the data. The data visualization 512 may be a graph or other visualization which may be predetermined for the type of pattern or anomaly of the current pattern or anomaly 504. The user interface 500 may contain a number of settings 514-516 for using the generated summaries. A cancel option 514 may permit the user to cancel editing the current pattern or anomaly 504 and undo any edits to the generated summary 504. A submit option 516 may cause the generated summary 506 to be submitted such as to a publication system, optionally with the currently displayed further generated summary 508 and/or the data visualization 512. The user interface 500 may also comprise a user feedback selection 518 for entering user feedback such as for the generated summary 506 or the further generated summary 508. Negative user feedback received may cause a new summary to be generated and displayed in the user interface 500.

Figure 6:
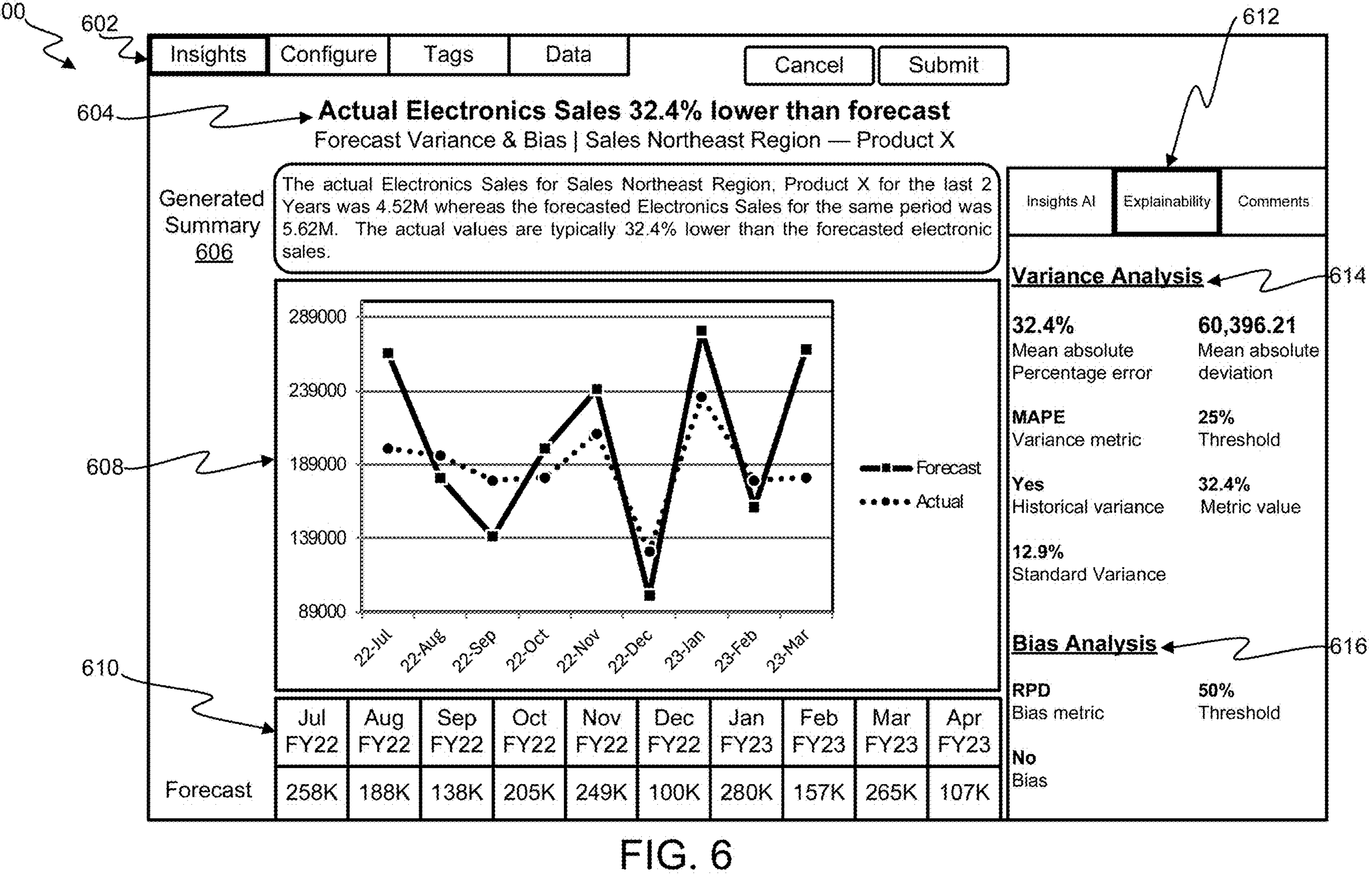
FIG. 6 illustrates another diagram of an example user interface for displaying generated summaries of patterns or anomalies with graphical representations of the patterns or anomalies and details of the pattern or anomaly.

FIG. 6 depicts a user interface 600, which may be an alternate view of the same user interface as FIG. 5, for displaying a detailed view of a pattern or anomaly for which a summary was generated. The user interface 600 may contain a number of views 602 including a view for displaying a detailed view of a pattern or anomaly. The user interface 600 displays a current pattern or anomaly 604 including a metadata of the pattern or anomaly such as a title or data view. The user interface 600 includes a generated summary 606 for the current pattern or anomaly 604. The user interface may display the generated summary 606 along with a data visualization 608 generated for the data. The data visualization 608 may be a graph or other visualization which may be predetermined for the type of pattern or anomaly of the current pattern or anomaly 604. The generated summary 606 may also be displayed with a data table 610 displaying at least some of the data that the current pattern or anomaly 604 describes. The generated summary 606 may also be displayed with further details 612 of the pattern or anomaly including settings 614-616 used to detect the pattern or anomaly. The settings 614-616 may contain settings for one or more types of analysis such as settings for a variance analysis 614 including a calculated variance, and variance metric used, and settings for a bias analysis 616 including a determination of bias and a bias metric used.

Figure 7:
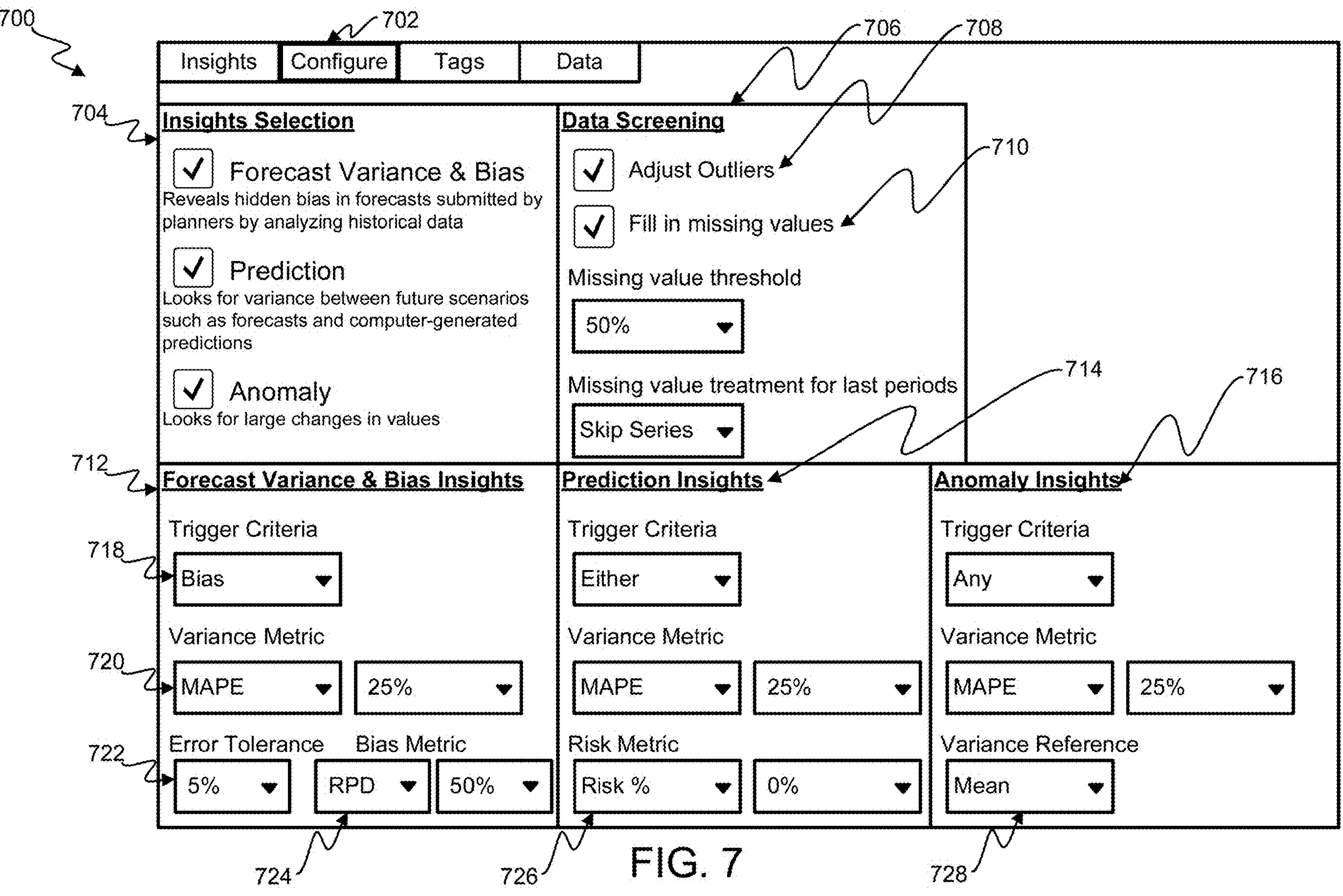
FIG. 7 illustrates a diagram of an example user interface for managing the detection and analysis of patterns or anomalies for multi-dimensional data.

FIG. 7 depicts a user interface 700 displaying a configuration page 702 for displaying controls for determining pattern or anomaly detection. The configuration page 702 contains a selection for insights 704 for selecting what type of patterns or anomalies may currently be detected. The configuration page 702 also contains a set of data manipulation options 706 such as for determining a number of processes for pre-screening data prior to pattern or anomaly detection. The data manipulation options 706 may contain a setting for adjusting outliers 708 to toggle whether to alter values that do not fit the set of data for reasons other than the presence of an anomaly. The data manipulation options 706 may also contain a setting for addressing missing values 710 such as by filling in missing values with a value derived from surrounding values by a determined threshold or by skipping missing values. The configuration page 702 also contains a plurality of settings 712-716 specific to certain types of pattern or anomalies. The plurality of settings 712-716 may contain a trigger criteria setting 718 for determining what triggers are to be used for determining the existence of a pattern or analysis. The trigger criteria setting 718 may be one or more triggers. The plurality of settings 712-716 may contain a variance metric 720 including a metric to calculate and a threshold value to compare against for determining if the variance exists. The plurality of settings 712-716 may contain an error tolerance for setting a tolerance for an error of a single element of a time series. The plurality of settings 712-716 may contain a bias metric 724 comprising a metric and a threshold for determining a comparison between two values for the determination of a bias. The plurality of settings 712-716 may contain a risk metric 726 including a metric and a threshold for determining a variance of a forecasted value from a base prediction value. The plurality of settings 712-716 may contain a variance reference setting 728 for determining a value from which a variance is determined such as a previous value or a mean of a timeseries of values.

Re-Prompting Large Language Model

After receiving the output summary from the large language model, the output summary is displayed to the user. Within the display to the user, the output summary may be edited by the user to modify the output summary into a final project summary. Alternatively, the output summary may be modified by re-prompting the large language model to generate a second output summary with new criteria. In yet another alternative, the user interface may permit the entering of feedback from the user, which may be used in re-prompting the large language model.

When re-prompting the large language model, the previous prompt may be used in whole or in part to prompt the large language model to generate the second output summary. A second prompt may be used which may incorporate components of the previous prompt, such as the instructions or project data to include. The second prompt may also include the prior output summary with added instructions explaining the prior output summary to be a prior attempt to generate a summary by the large language model and any additional instructions of changes or differences to include in the second output summary. The second prompt may also include user feedback entered in response to the display of the prior output summary, which may indicate changes or differences to include in the second output summary.

Alternatively, when re-prompting the large language model, the second prompt may be sent to the large language model within the same session with the large language model as the previous prompt. In this case, the prompt may refer to the previous response and indicate changes or desired differences for a second output summary.

A user input indicating to re-prompt the large language model may be a selection from a pre-determined list of alterations to the output summary. For example, options may be displayed with the output summary to lengthen or shorten the output summary. In the case that a user selects an option to shorten or lengthen the output summary, a new prompt may be generated where the prompt is generated using a profile for generating shorter or longer prompts than a prior profile used to generate the first prompt.

After an output prompt is selected by the user and optionally undergone a post-processing step, the output summary may be stored and displayed to the user. The user interface for requesting a project summary may also include a publication method, such as sending the summary as a message or submitting the summary to public display on a website.

Summary Generation by AI Agents

Prompt generation and execution for multi-dimensional analysis may be performed by an artificial intelligence agent. One or more AI agents may be tasked with generating one or more summaries of multi-dimensional data. The AI agents may be trained to perform specific tasks with regards to multi-dimensional analysis such as generating the prompt to a large language model or performing analysis on multi-dimensional data.

The one or more AI agents may be specific to a certain type of data or use case. For example, an AI agent may be trained only using multi-dimensional data representing sales data for one or more products, in which case the AI agent may be specific to handling the generation of summaries of multi-dimensional data analysis relating to sales data such as sales forecasting or profit realization. The one or more AI agents may be selected by first determining a type of data or use case of the set of multi-dimensional data. The determined type of data or use case may then be compared to a type of data or use case associated with each AI agent of a plurality of pre-trained AI agents.

In one embodiment, a managing agent determines one or more types of data being analyzed, and the managing agent assigns one or more worker agents specialized to handle each of the one or more types determined. The worker agents may analyze the data with the assistance of generative AI, one or more customized prompt templates optionally specific to the corresponding worker agent, and/or one or more customized tools optionally specific to the corresponding worker agent. The managing agent may then assemble results from the one or more worker agents to provide a cohesive analysis of the multidimensional data.

The one or more AI agents may perform additional tasks prior to or after prompting a large language model for generating summaries of multi-dimensional data analysis relevant to the type of data or use case associated with the data. For example, an AI agent used for multi-dimensional data analysis of data involving personally identifiable information may perform an extra step prior to generating a prompt of removing or masking certain personally identifiable information from the data such that the personally identifiable information is not exposed to the large language model. In another example the same AI agent may, after generating a prompt and prompting a large language model to generate a summary, perform an extra step of analyzing the generated summary and editing the summary or re-prompting the large language model to generate a new summary when aspects of the summary indicate a bias. The additional tasks may be facilitated by a set of tools accessible by the one or more AI agents such as access to submit API calls, other machine learning models, or access to further AI agents.

In one example, the one or more AI agents includes a managing AI agent, which instantiates each of the one or more AI agents used in generating summaries of multi-dimensional analysis. The managing AI agent may determine a number of other AI agents necessary to generate summaries of multi-dimensional analysis for the set of multi-dimensional data, such as by parsing the dimensions of the multi-dimensional data to determine a type of data or use case of the multi-dimensional data. The managing AI agent may determine, such as by parsing the dimensions of the multi-dimensional data, a number of analyses to perform and generate summaries of. The managing AI agent may instantiate a number of AI agents to each perform one of the number of analyses to perform for the multi-dimensional data. For example, a managing AI agent may determine a set of multi-dimensional data contains data for sales of a first period, data for projected sales for the first period, and data for sales of a second period. The managing AI agent may determine a first analysis to perform between the data for sales of the first period and data for projected sales for the first period and instantiate a first AI agent for performing the first analysis and generating a summary. The managing AI agent may also determine a second analysis to perform between the data for sales of the first period and data for sales of the second period and instantiate a second AI agent for performing the second analysis and generating a summary.

Alternatively, an AI agent may be tasked with determining when a pattern or anomaly exists and initiates the generation of a prompt to generate a summary of the pattern or anomaly in response to detecting the pattern or anomaly. For example, an AI agent may be tasked with determining when a type of anomaly exists within a set of multi-dimensional data. The AI agent may perform a data analysis on the data in response to receiving an update to the set of multi-dimensional data. In another example, an AI agent may be tasked with reviewing predictions for errors and generating a prompt to generate a summary for the prediction variance when it is detected.

The one or more AI agents may communicate between each other by sharing data or derived analyses or generated summaries. For example, a first AI agent may be tasked with performing data analysis, the results of which the first AI agent gives to a second AI agent for generating a summary of. AI agents may share data of patterns or anomalies for the purposes of determining underlying information about the pattern or anomaly. For example, in the case that multiple anomalies are detected for a set of multi-dimensional data by a plurality of AI agents, the plurality of AI agents may communicate their respective determined anomalies in order to determine an underlying cause for the multiple anomalies.

Computer System Architecture

Figure 8:
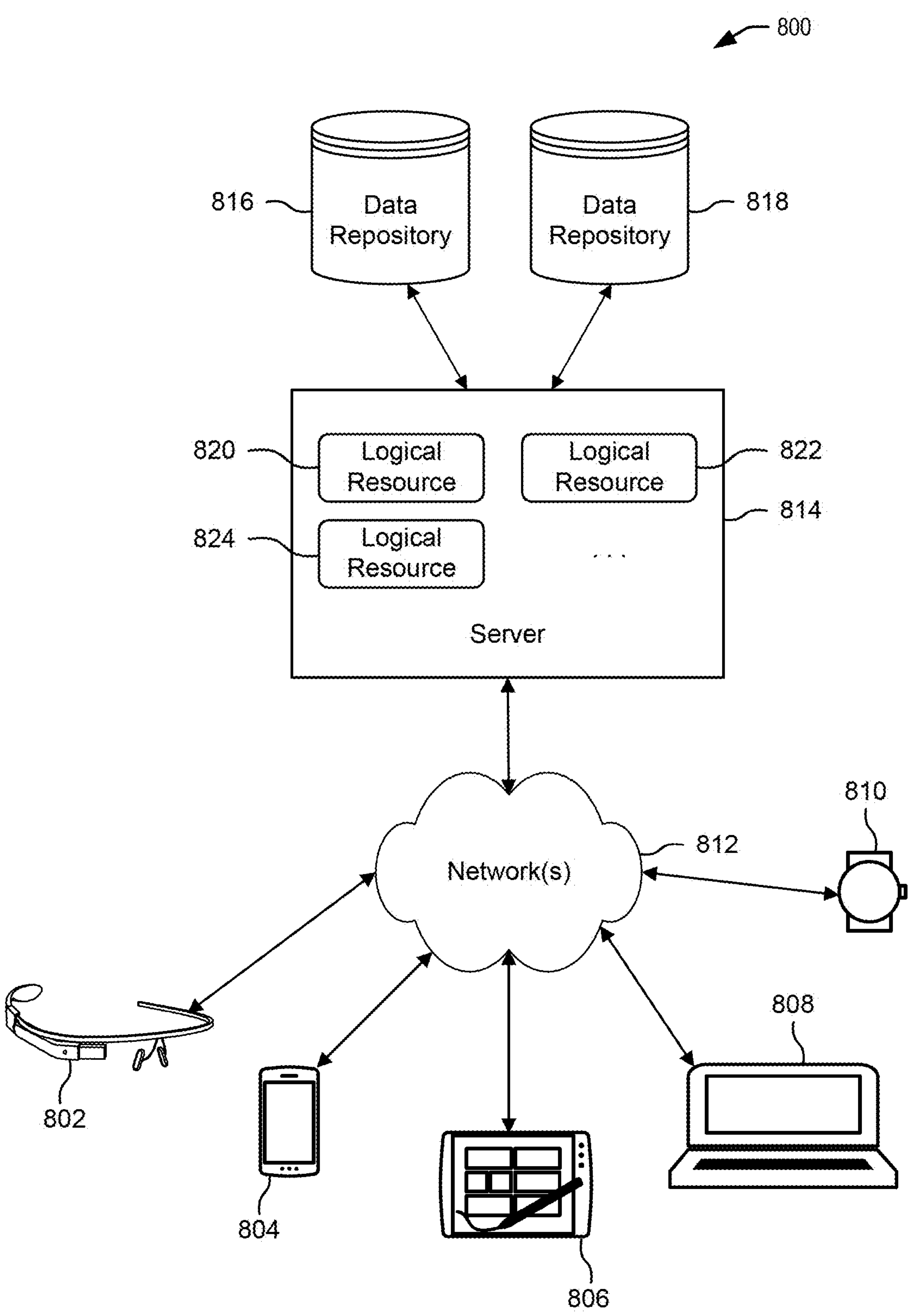
FIG. 8 depicts a simplified diagram of a distributed system for implementing certain aspects.

FIG. 8 depicts a simplified diagram of a distributed system 800 for implementing an embodiment. In the illustrated embodiment, distributed system 800 includes one or more client computing devices 802, 804, 806, 808, and/or 810 coupled to a server 814 via one or more communication networks 812. Clients computing devices 802, 804, 806, 808, and/or 810 may be configured to execute one or more applications.

In various aspects, server 814 may be adapted to run one or more services or software applications that enable techniques for generating multi-dimensional data analysis summaries.

In certain aspects, server 814 may also provide other services or software applications that can include non-virtual and virtual environments. In some aspects, these services may be offered as web-based or cloud services, such as under a Software as a Service (SaaS) model to the users of client computing devices 802, 804, 806, 808, and/or 810. Users operating client computing devices 802, 804, 806, 808, and/or 810 may in turn utilize one or more client applications to interact with server 814 to utilize the services provided by these components.

In the configuration depicted in FIG. 8, server 814 may include one or more components 820, 822 and 824 that implement the functions performed by server 814. These components may include software components that may be executed by one or more processors, hardware components, or combinations thereof. It should be appreciated that various different system configurations are possible, which may be different from distributed system 800. The embodiment shown in FIG. 8 is thus one example of a distributed system for implementing an embodiment system and is not intended to be limiting.

Users may use client computing devices 802, 804, 806, 808, and/or 810 for techniques for generating multi-dimensional data analysis summaries in accordance with the teachings of this disclosure. A client device may provide an interface that enables a user of the client device to interact with the client device. The client device may also output information to the user via this interface. Although FIG. 8 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 812 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 812 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth, and/or any other wireless protocol), and/or any combination of these and/or other networks.

Server 814 may be composed of one or more general purpose computers, specialized server computers (including, by way of example, PC (personal computer) servers, UNIX® servers, LINUX® servers, mid-range servers, mainframe computers, rack-mounted servers, etc.), server farms, server clusters, a Real Application Cluster (RAC), database servers, or any other appropriate arrangement and/or combination. Server 814 can include one or more virtual machines running virtual operating systems, or other computing architectures involving virtualization such as one or more flexible pools of logical storage devices that can be virtualized to maintain virtual storage devices for the server. In various aspects, server 814 may be adapted to run one or more services or software applications that provide the functionality described in the foregoing disclosure.

The computing systems in server 814 may run one or more operating systems including any of those discussed above, as well as any commercially available server operating system. Server 814 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 814 may include one or more applications to analyze and consolidate data feeds and/or event updates received from users of client computing devices 802, 804, 806, 808, and/or 810. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 814 may also include one or more applications to display the data feeds and/or real-time events via one or more display devices of client computing devices 802, 804, 806, 808, and/or 810.

Distributed system 800 may also include one or more data repositories 816, 818. These data repositories may be used to store data and other information in certain aspects. For example, one or more of the data repositories 816, 818 may be used to store information for techniques for generating multi-dimensional data analysis summaries. Data repositories 816, 818 may reside in a variety of locations. For example, a data repository used by server 814 may be local to server 814 or may be remote from server 814 and in communication with server 814 via a network-based or dedicated connection. Data repositories 816, 818 may be of different types. In certain aspects, a data repository used by server 814 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 816, 818 may also be used by applications to store application data. The data repositories used by applications may be of different types such as, for example, a key-value store repository, an object store repository, or a general storage repository supported by a file system.

In one embodiment, server 814 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 9:
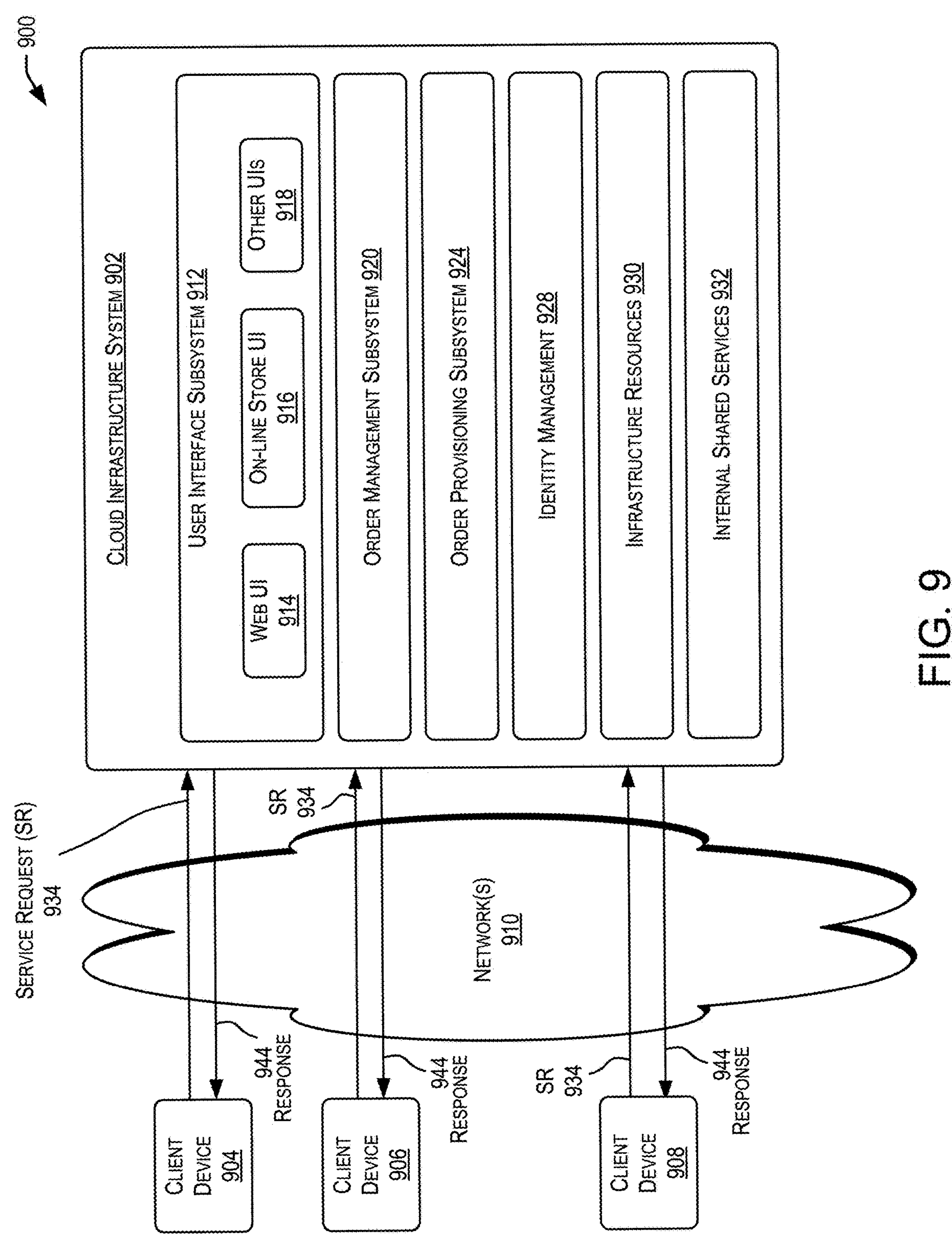
FIG. 9 is a simplified block diagram of one or more components of a system environment by which services provided by one or more components of an embodiment system may be offered as cloud services, in accordance with certain aspects.

FIG. 9 is a simplified block diagram of a cloud-based system environment in which generating multi-dimensional data analysis summaries, in accordance with certain aspects. may be performed. In the embodiment depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 814. The computers in cloud infrastructure system 902 may be organized as general purpose computers, specialized server computers, server farms, server clusters, or any other appropriate arrangement and/or combination.

Network(s) 910 may facilitate communication and exchange of data between clients 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The embodiment depicted in FIG. 9 is only one example of a cloud infrastructure system and is not intended to be limiting. It should be appreciated that, in some other aspects, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative aspects.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 910 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 902 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 902 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 902. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 902. Cloud infrastructure system 902 then performs processing to provide the services requested in the tenant's subscription order. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public tenant, where the tenant can be an individual or an enterprise. In certain other aspects, under a private cloud model, cloud infrastructure system 902 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 902 and the services provided may be shared by several organizations in a related community. Various other models such as hybrids of the above mentioned models may also be used.

Client computing devices 904, 906, and 908 may be of different types (such as devices 802, 804, 806, and 808 depicted in FIG. 8) and may be capable of operating one or more client applications. A user may use a client device to interact with cloud infrastructure system 902, such as to request a service provided by cloud infrastructure system 902.

In some aspects, the processing performed by cloud infrastructure system 902 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 902 for determining the intent of an utterance. The data used for this analysis may include structured data (e.g., data stored in a database or structured according to a structured model) and/or unstructured data (e.g., data blobs (binary large objects)).

As depicted in the embodiment in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like.

In certain aspects, to facilitate efficient provisioning of these resources for supporting the various cloud services provided by cloud infrastructure system 902 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a tenant may, using a client device, request (service request 934) one or more services provided by cloud infrastructure system 902 using one or more of interfaces 914, 916, and 918. For example, a tenant may access the online store, browse cloud services offered by cloud infrastructure system 902, and place a subscription order for one or more services offered by cloud infrastructure system 902 that the tenant wishes to subscribe to. The service request may include information identifying the tenant and one or more services that the tenant desires to subscribe to. For example, a tenant may place a subscription order for a chatbot related service offered by cloud infrastructure system 902. As part of the order, the client may provide information identifying the input (e.g. utterances).

In certain aspects, such as the embodiment depicted in FIG. 9, cloud infrastructure system 902 may comprise a service management subsystem (OMS) 920 that is configured to process the new order. As part of this processing, OMS 920 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 920 may then invoke the service provisioning subsystem (OPS) 924 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 902 may send a response or notification 944 to the requesting tenant to indicate when the requested service is now ready for use. In some instances, information (e.g., a link) may be sent to the tenant that enables the tenant to start using and availing the benefits of the requested services.

Cloud infrastructure system 902 may provide services to multiple tenants. For each tenant, cloud infrastructure system 902 is responsible for managing information related to one or more subscription orders received from the tenant, maintaining tenant data related to the orders, and providing the requested services to the tenant or clients of the tenant. Cloud infrastructure system 902 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 902 may provide services to multiple tenants in parallel. Cloud infrastructure system 902 may store information for these tenants, including possibly proprietary information. In certain aspects, cloud infrastructure system 902 comprises an identity management subsystem (IMS) 928 that is configured to manage tenant's information and provide the separation of the managed information such that information related to one tenant is not accessible by another tenant. IMS 928 may be configured to provide various security-related services such as identity services, such as information access management, authentication and authorization services, services for managing tenant identities and roles and related capabilities, and the like.

Figure 10:
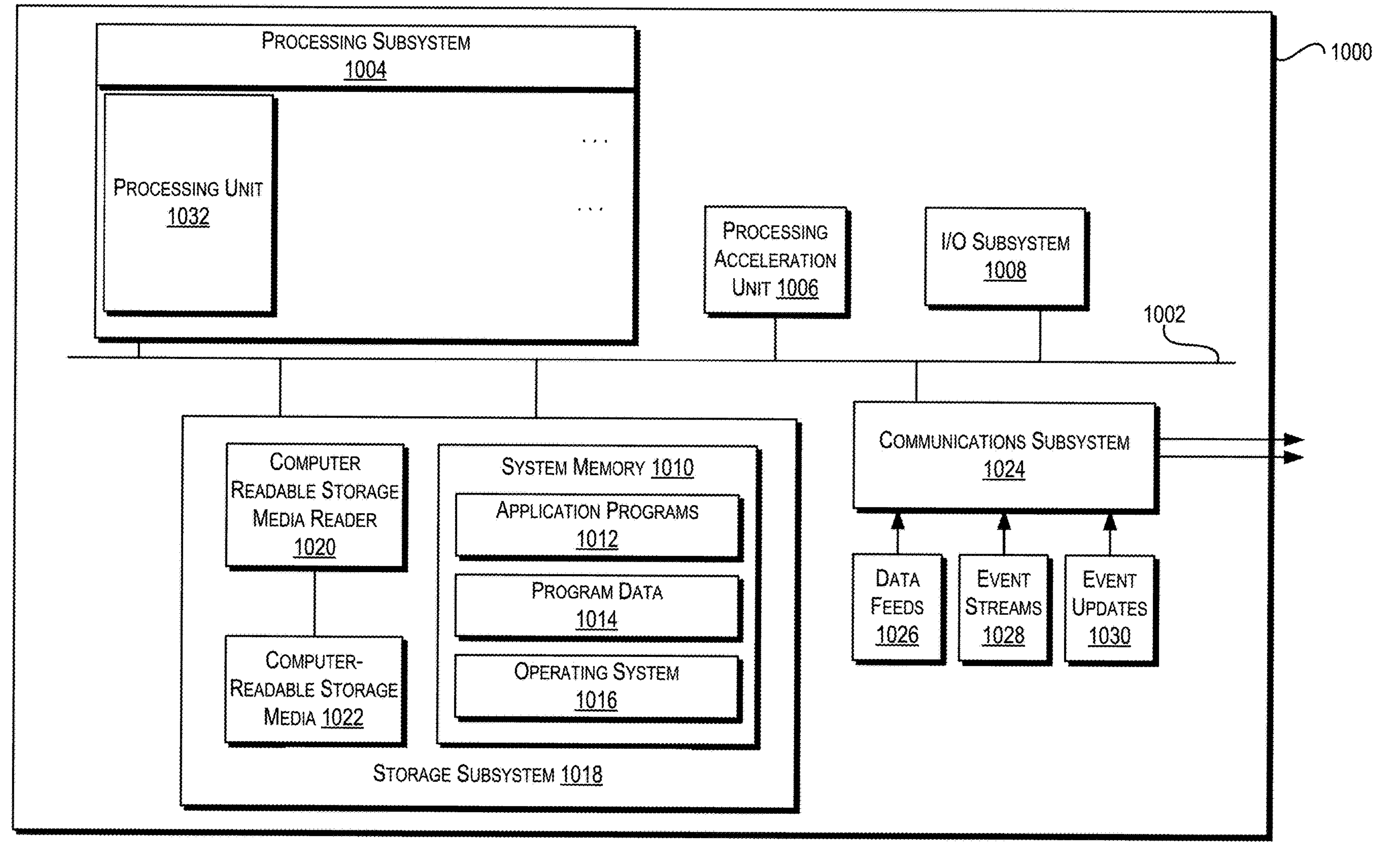
FIG. 10 illustrates an example computer system that may be used to implement certain aspects.

FIG. 10 illustrates an exemplary computer system 1000 that may be used to implement certain aspects. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory and/or transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative aspects of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may be single core or multicore processors. The processing resources of computer system 1000 can be organized into one or more processing units 1032, 1034, etc. A processing unit may include one or more processors, one or more cores from the same or different processors, a combination of cores and processors, or other combinations of cores and processors. In some aspects, processing subsystem 1004 can include one or more special purpose co-processors such as graphics processors, digital signal processors (DSPs), or the like. In some aspects, some or all of the processing units of processing subsystem 1004 can be implemented using customized circuits, such as application specific integrated circuits (ASICs), or field programmable gate arrays (FPGAs).

In some aspects, the processing units in processing subsystem 1004 can execute instructions stored in system memory 1010 or on computer readable storage media 1022. In various aspects, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above. In instances where computer system 1000 is executing one or more virtual machines, one or more processing units may be allocated to each virtual machine.

In certain aspects, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some aspects. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 1022 may store programming and data constructs that provide the functionality of some aspects. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, digital video disc (DVD), a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1018 may also include a computer-readable storage media reader 1020 that can further be connected to computer-readable storage media 1022. Reader 1020 may receive and be configured to read data from a memory device such as a disk, a flash drive, etc.

In certain aspects, computer system 1000 may support virtualization technologies, including but not limited to virtualization of processing and memory resources. For example, computer system 1000 may provide support for executing one or more virtual machines. In certain aspects, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, the communications subsystem may be used to transmit a response to a user regarding the inquiry for a chatbot.

Communications subsystem 1024 may support both wired and/or wireless communication protocols. For example, in certain aspects, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1024 can provide wired network connectivity (e.g., Ethernet) in addition to or instead of a wireless interface.

Communications subsystem 1024 can receive and transmit data in various forms. For example, in some aspects, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

determining that analysis is enabled for a hierarchy of data of a multi-dimensional set of data, wherein analysis is disabled for one or more other hierarchies of data of the multi-dimensional set of data;

based at least in part on determining that the analysis is enabled, analyzing members of the hierarchy to detect a pattern or anomaly within the hierarchy;

in response to detecting the pattern or anomaly in a member of the hierarchy, generating a prompt comprising:

a path to the member, wherein the path comprises one or more ancestor nodes and a delimiter between the one or more ancestor nodes and the member;

one or more values identified as having the pattern or anomaly for the member;

one or more metrics that define an extent of the pattern or anomaly in relation to one or more other values;

one or more time periods during which the pattern or anomaly occurred;

one or more examples comprising one or more example paths, one or more example values, one or more example metrics, one or more example time periods, and one or more example summaries of one or more example patterns or anomalies for one or more example members at the one or more example paths;

prompting a large language model with the prompt to generate a resulting summary of the pattern or anomaly;

causing display of at least part of the resulting summary of the pattern or anomaly.

2. The computer-implemented method of claim 1, wherein the one or more other values is a mean value and wherein the anomaly is a detected by a determination that the one or more metrics that define an extent of the pattern or anomaly in relation to one or more other values is three standard deviations from a mean value.

3. The computer-implemented method of claim 1, wherein the one or more other values is a forecasted value generated by a mathematical trend of a set of data and wherein the one or more values identified as having the pattern or anomaly for the member is a recorded value.

4. The computer-implemented method of claim 1, wherein the one or more other values is a forecasted value generated by a mathematical trend of a set of data and wherein the one or more values identified as having the pattern or anomaly for the member is a predicted value generated by a machine learning model trained to predict values for the hierarchy of data.

5. The computer-implemented method of claim 1, wherein the one or more example paths comprises the delimiter between one or more example ancestors and the one or more example members.

6. The computer-implemented method of claim 1, wherein the method further comprises:

receiving user feedback for the resulting summary indicating a modification to the resulting summary;

re-prompting the large language model to generate a modified summary based on the indicated modification;

causing display of at least part of the modified summary.

7. The computer-implemented method of claim 1, wherein the method is performed by an artificial intelligence agent trained on multi-dimensional training data of a same data type as the multi-dimensional set of data, wherein one or more other data types are handled by one or more other agents of a plurality of agents, and wherein the method further comprises:

filtering the data of the multi-dimensional set of data based on a method of filtering relevant to the data type of the multi-dimensional set of data.

8. A computer-program product comprising one or more non-transitory machine-readable storage media, including stored instructions configured to cause a computing system to perform a set of actions including:

determining that analysis is enabled for a hierarchy of data of a multi-dimensional set of data, wherein analysis is disabled for one or more other hierarchies of data of the multi-dimensional set of data;

based at least in part on determining that the analysis is enabled, analyzing members of the hierarchy to detect a pattern or anomaly within the hierarchy;

in response to detecting the pattern or anomaly in a member of the hierarchy, generating a prompt comprising:

a path to the member, wherein the path comprises one or more ancestor nodes and a delimiter between the one or more ancestor nodes and the member;

one or more values identified as having the pattern or anomaly for the member;

one or more metrics that define an extent of the pattern or anomaly in relation to one or more other values;

one or more time periods during which the pattern or anomaly occurred;

one or more examples comprising one or more example paths, one or more example values, one or more example metrics, one or more example time periods, and one or more example summaries of one or more example patterns or anomalies for one or more example members at the one or more example paths;

prompting a large language model with the prompt to generate a resulting summary of the pattern or anomaly;

causing display of at least part of the resulting summary of the pattern or anomaly.

9. The computer-program product of claim 8, wherein the one or more other values is a mean value and wherein the anomaly is a detected by a determination that the one or more metrics that define an extent of the pattern or anomaly in relation to one or more other values is three standard deviations from a mean value.

10. The computer-program product of claim 8, wherein the one or more other values is a forecasted value generated by a mathematical trend of a set of data and wherein the one or more values identified as having the pattern or anomaly for the member is a recorded value.

11. The computer-program product of claim 8, wherein the one or more other values is a forecasted value generated by a mathematical trend of a set of data and wherein the one or more values identified as having the pattern or anomaly for the member is a predicted value generated by a machine learning model trained to predict values for the hierarchy of data.

12. The computer-program product of claim 8, wherein the one or more example paths comprises the delimiter between one or more example ancestors and the one or more example members.

13. The computer-program product of claim 8, wherein the set of actions further includes:

receiving user feedback for the resulting summary indicating a modification to the resulting summary;

re-prompting the large language model to generate a modified summary based on the indicated modification;

causing display of at least part of the modified summary.

14. The computer-program product of claim 8, wherein the set of actions are performed by an artificial intelligence agent trained on multi-dimensional training data of a same data type as the multi-dimensional set of data, wherein one or more other data types are handled by one or more other agents of a plurality of agents, and wherein the set of actions further includes:

filtering the data of the multi-dimensional set of data based on a method of filtering relevant to the data type of the multi-dimensional set of data.

15. A system comprising:

one or more processors;

one or more non-transitory computer-readable media storing instructions, which, when executed by the system, cause the system to perform a set of actions including:

determining that analysis is enabled for a hierarchy of data of a multi-dimensional set of data, wherein analysis is disabled for one or more other hierarchies of data of the multi-dimensional set of data;

based at least in part on determining that the analysis is enabled, analyzing members of the hierarchy to detect a pattern or anomaly within the hierarchy;

in response to detecting the pattern or anomaly in a member of the hierarchy, generating a prompt comprising:

a path to the member, wherein the path comprises one or more ancestor nodes and a delimiter between the one or more ancestor nodes and the member;

one or more values identified as having the pattern or anomaly for the member;

one or more metrics that define an extent of the pattern or anomaly in relation to one or more other values;

one or more time periods during which the pattern or anomaly occurred;

one or more examples comprising one or more example paths, one or more example values, one or more example metrics, one or more example time periods, and one or more example summaries of one or more example patterns or anomalies for one or more example members at the one or more example paths;

prompting a large language model with the prompt to generate a resulting summary of the pattern or anomaly;

causing display of at least part of the resulting summary of the pattern or anomaly.

16. The system of claim 15, wherein the one or more other values is a mean value and wherein the anomaly is a detected by a determination that the one or more metrics that define an extent of the pattern or anomaly in relation to one or more other values is three standard deviations from a mean value.

17. The system of claim 15, wherein the one or more other values is a forecasted value generated by a mathematical trend of a set of data and wherein the one or more values identified as having the pattern or anomaly for the member is a recorded value.

18. The system of claim 15, wherein the one or more other values is a forecasted value generated by a mathematical trend of a set of data and wherein the one or more values identified as having the pattern or anomaly for the member is a predicted value generated by a machine learning model trained to predict values for the hierarchy of data.

19. The system of claim 15, wherein the one or more example paths comprises the delimiter between one or more example ancestors and the one or more example members.

20. The system of claim 15, wherein the set of actions further includes:

receiving user feedback for the resulting summary indicating a modification to the resulting summary;

re-prompting the large language model to generate a modified summary based on the indicated modification;

causing display of at least part of the modified summary.

* * * * *